No. 827,463. PATENTED JULY 31, 1906.
W. B. PEARSON & C. E. ROBERTS.
SCREW MACHINE.
APPLICATION FILED MAY 9, 1902.
24 SHEETS—SHEET 1.
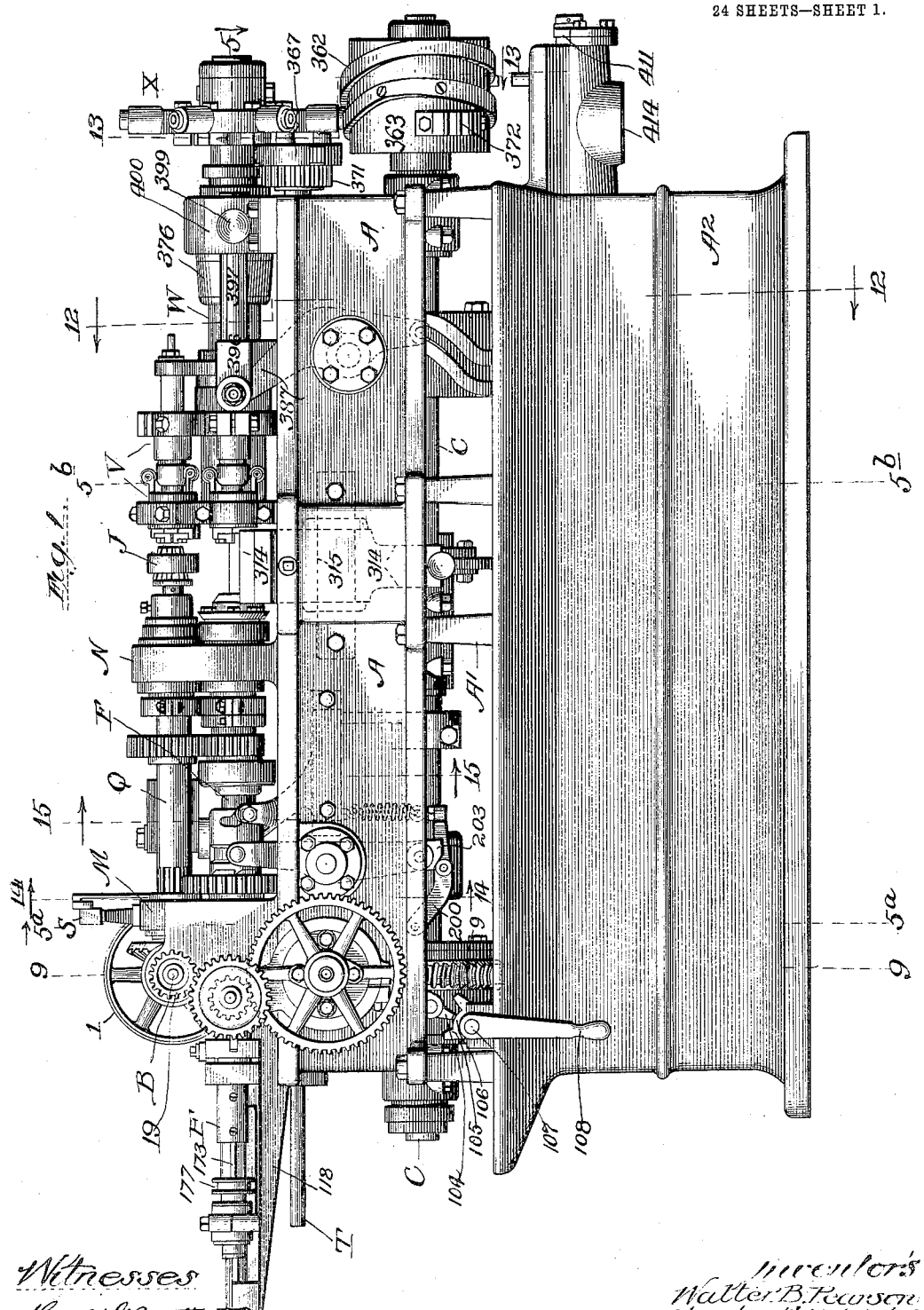
Witnesses
Harold G. Bandt
Eder Bandt
Inventors
Walter B. Pearson
Charles F. Roberts
By Jno. E. Waldo Atty.

No. 827,463. PATENTED JULY 31, 1906.
W. B. PEARSON & C. E. ROBERTS.
SCREW MACHINE.
APPLICATION FILED MAY 9, 1902.
24 SHEETS—SHEET 2.
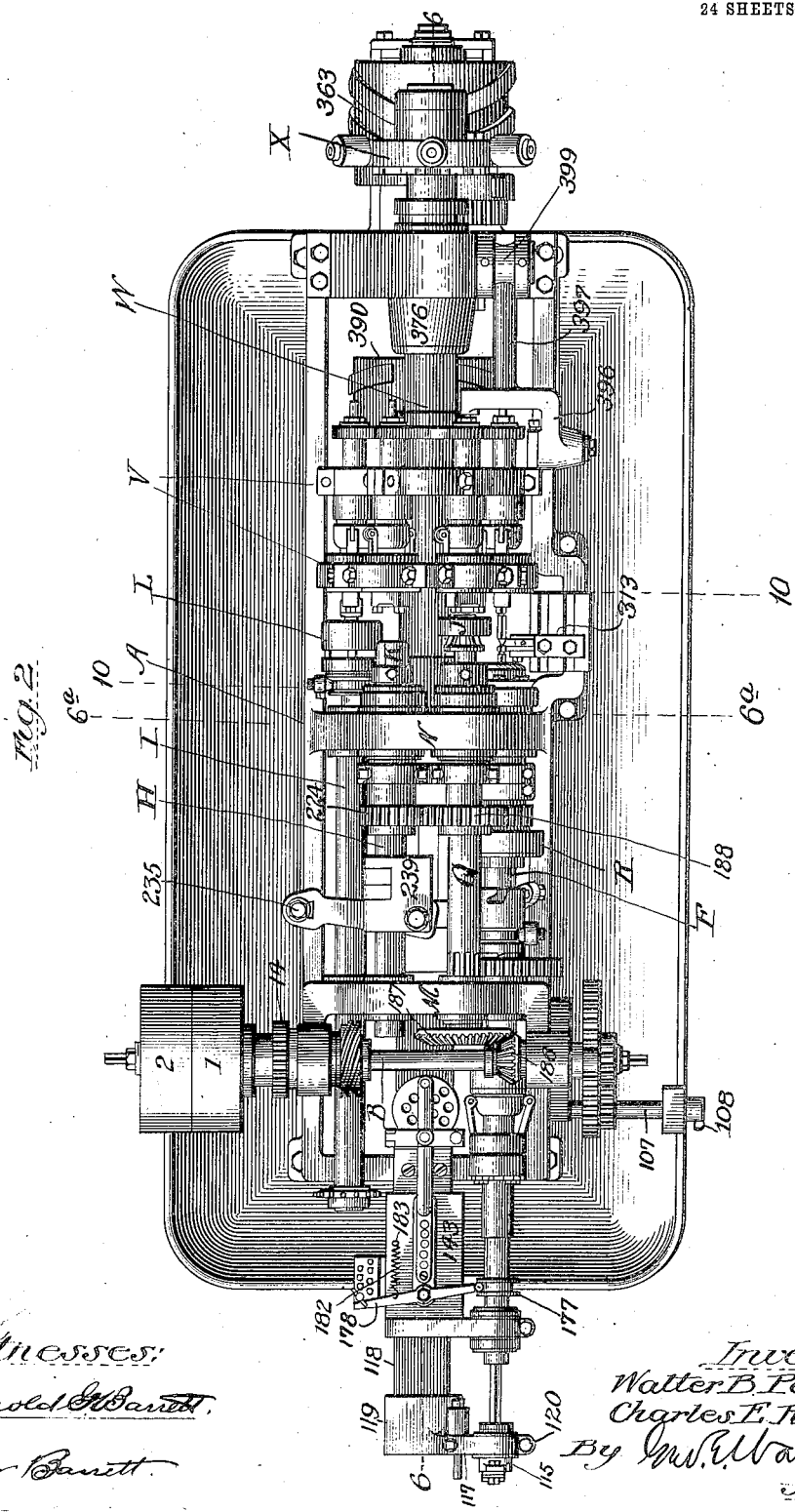

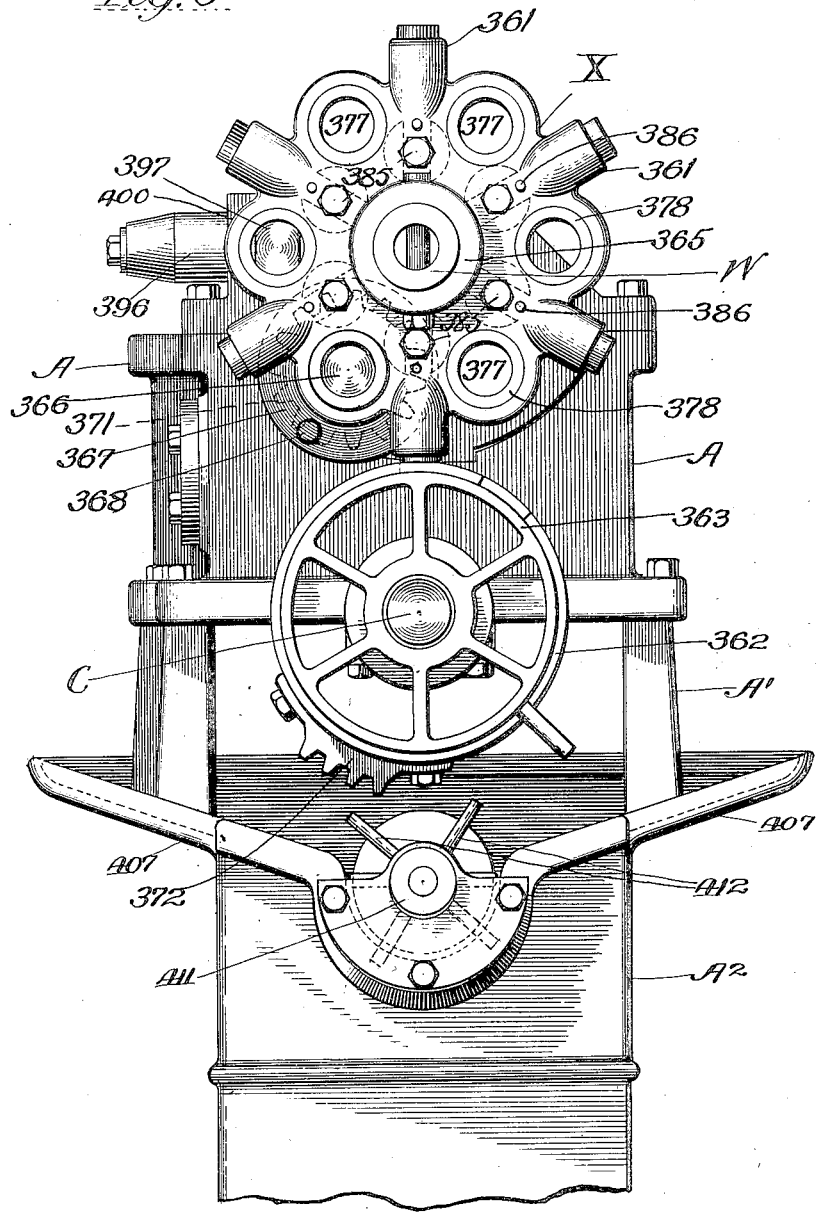

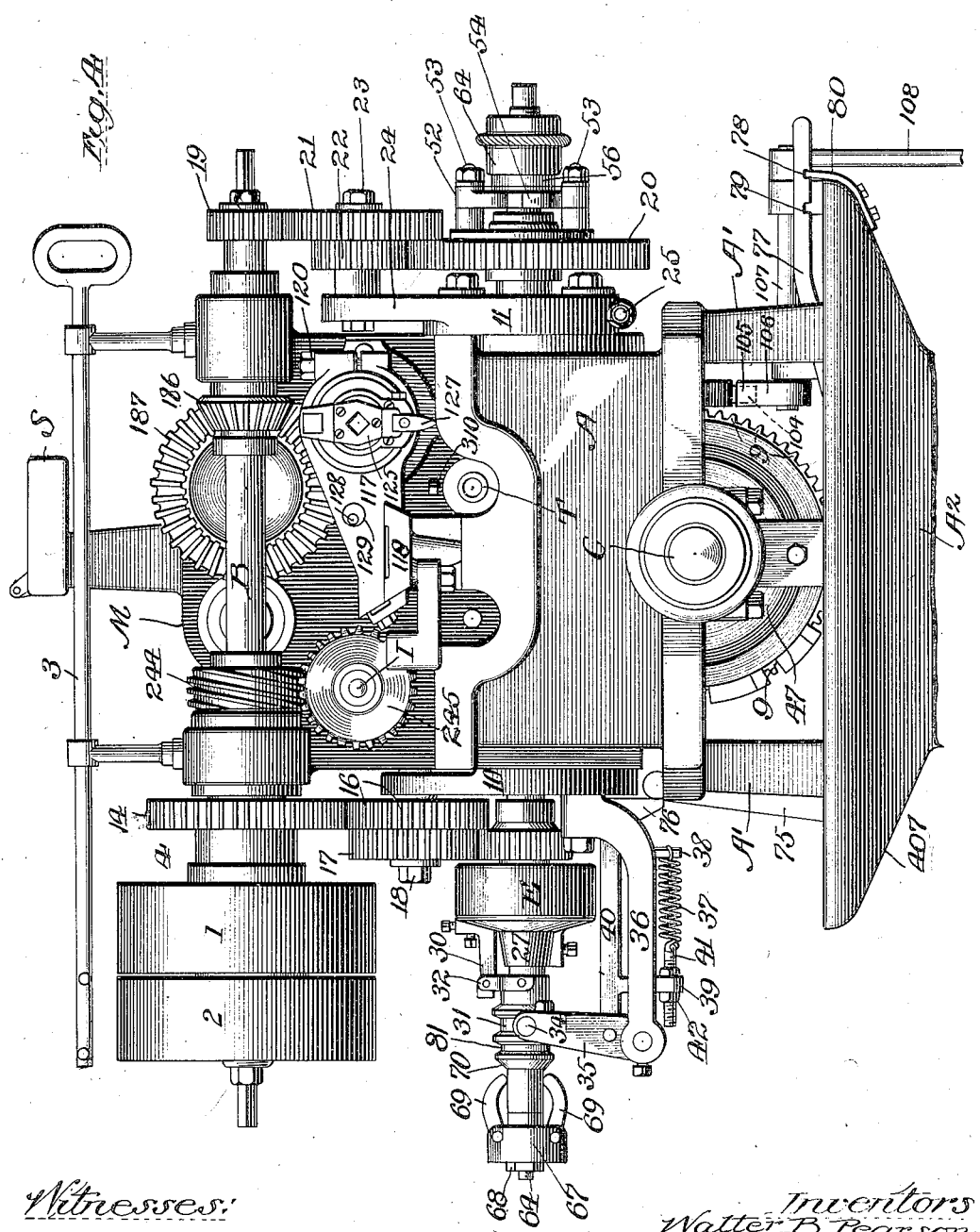

No. 827,463. PATENTED JULY 31, 1906.
W. B. PEARSON & C. E. ROBERTS.
SCREW MACHINE.
APPLICATION FILED MAY 9, 1902.
24 SHEETS—SHEET 5.
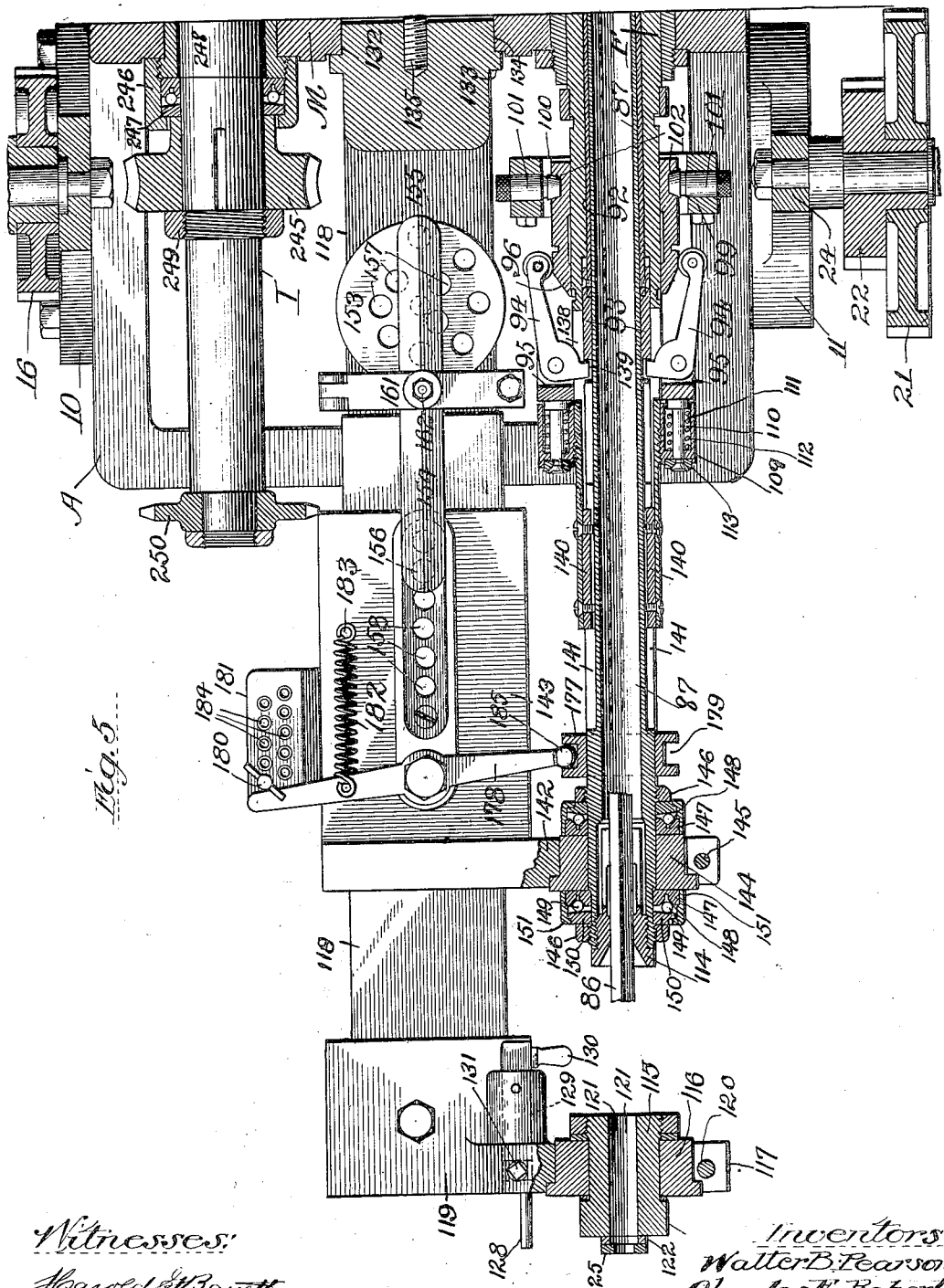
Witnesses:
Harold H Barrett
Edw. Barrett
Inventors
Walter B. Pearson
Charles E. Roberts
By Geo. T. Waldo
Atty.

No. 827,463. PATENTED JULY 31, 1906.
W. B. PEARSON & C. E. ROBERTS.
SCREW MACHINE.
APPLICATION FILED MAY 9, 1902.
24 SHEETS—SHEET 6.
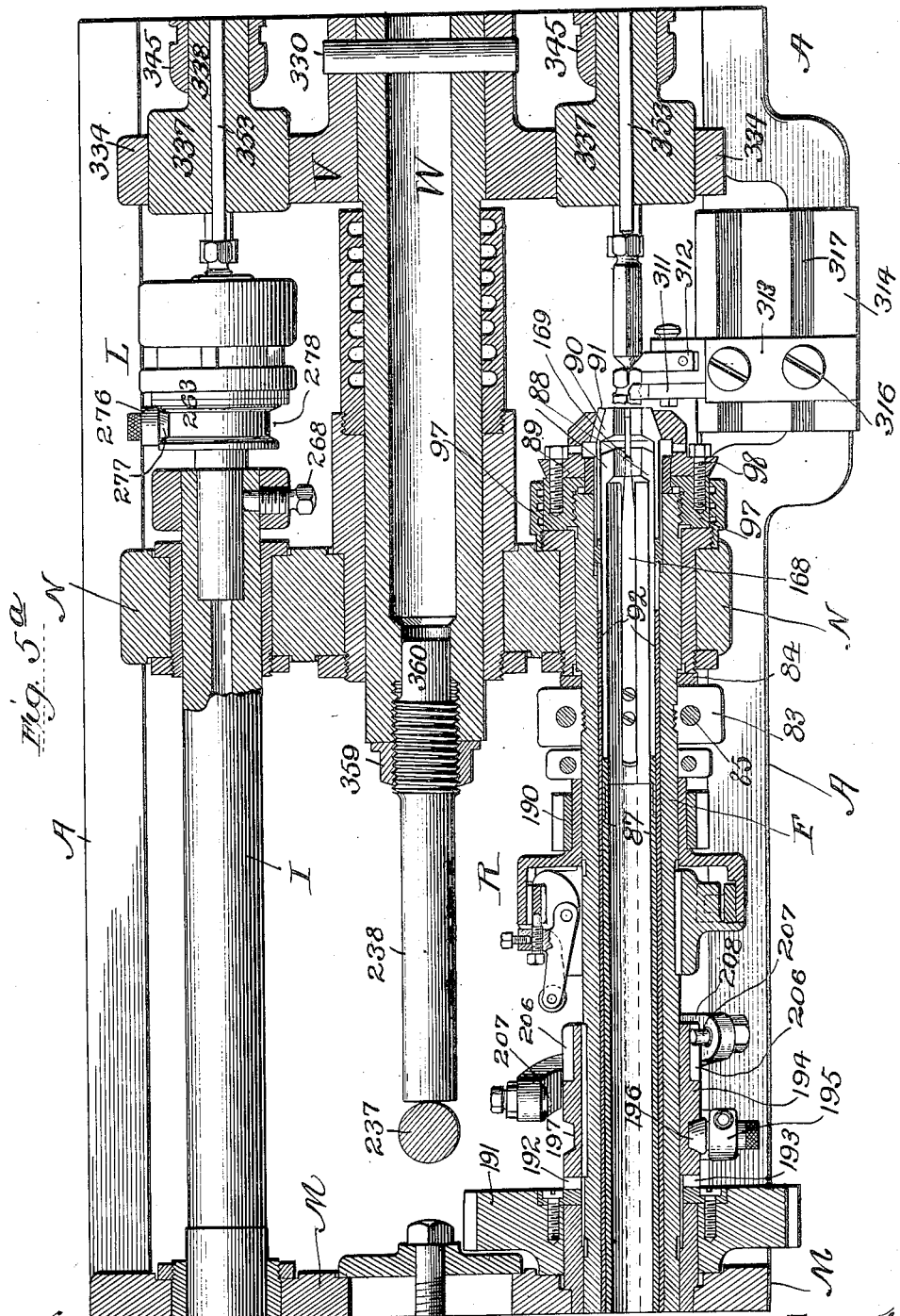

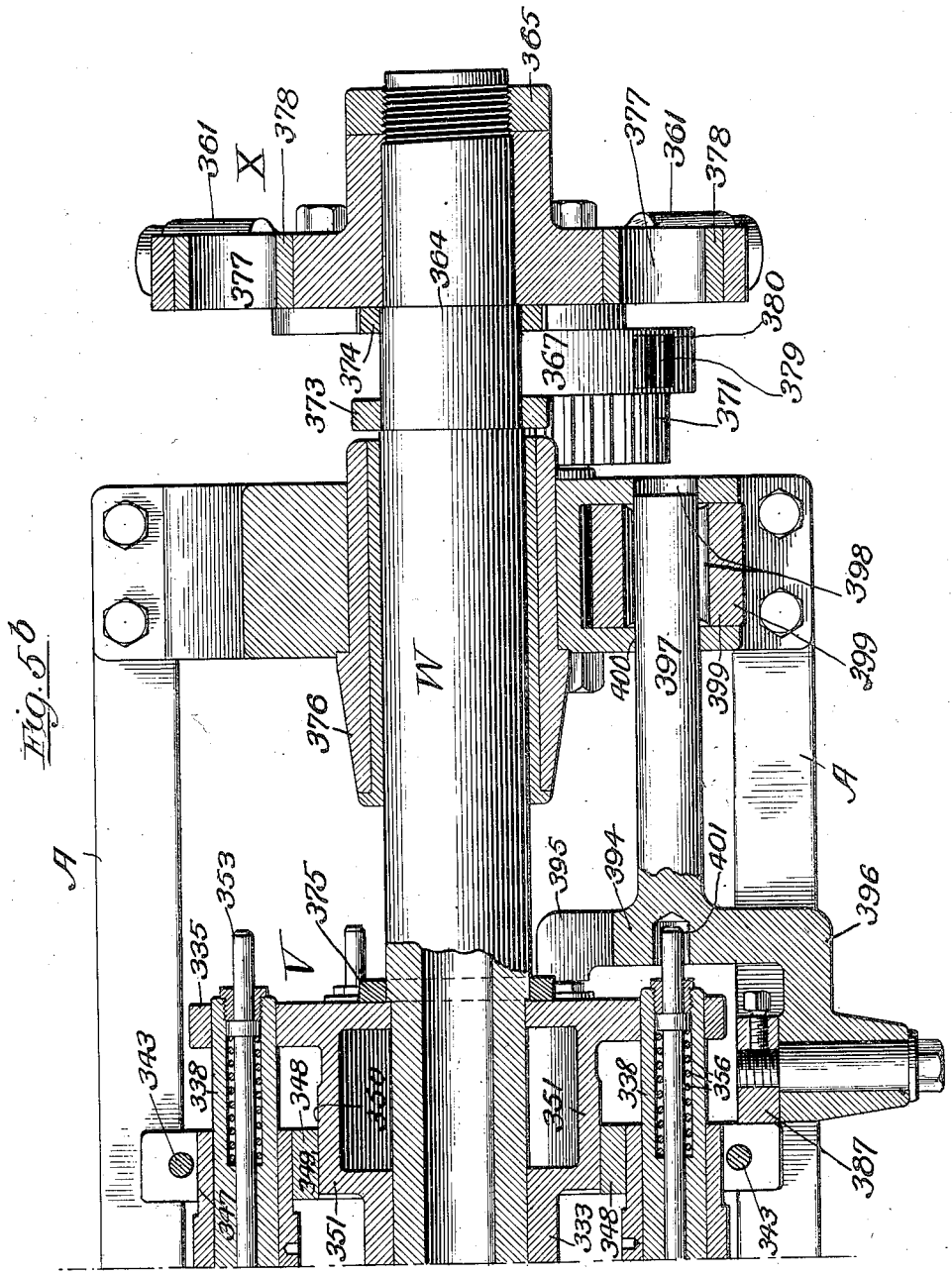

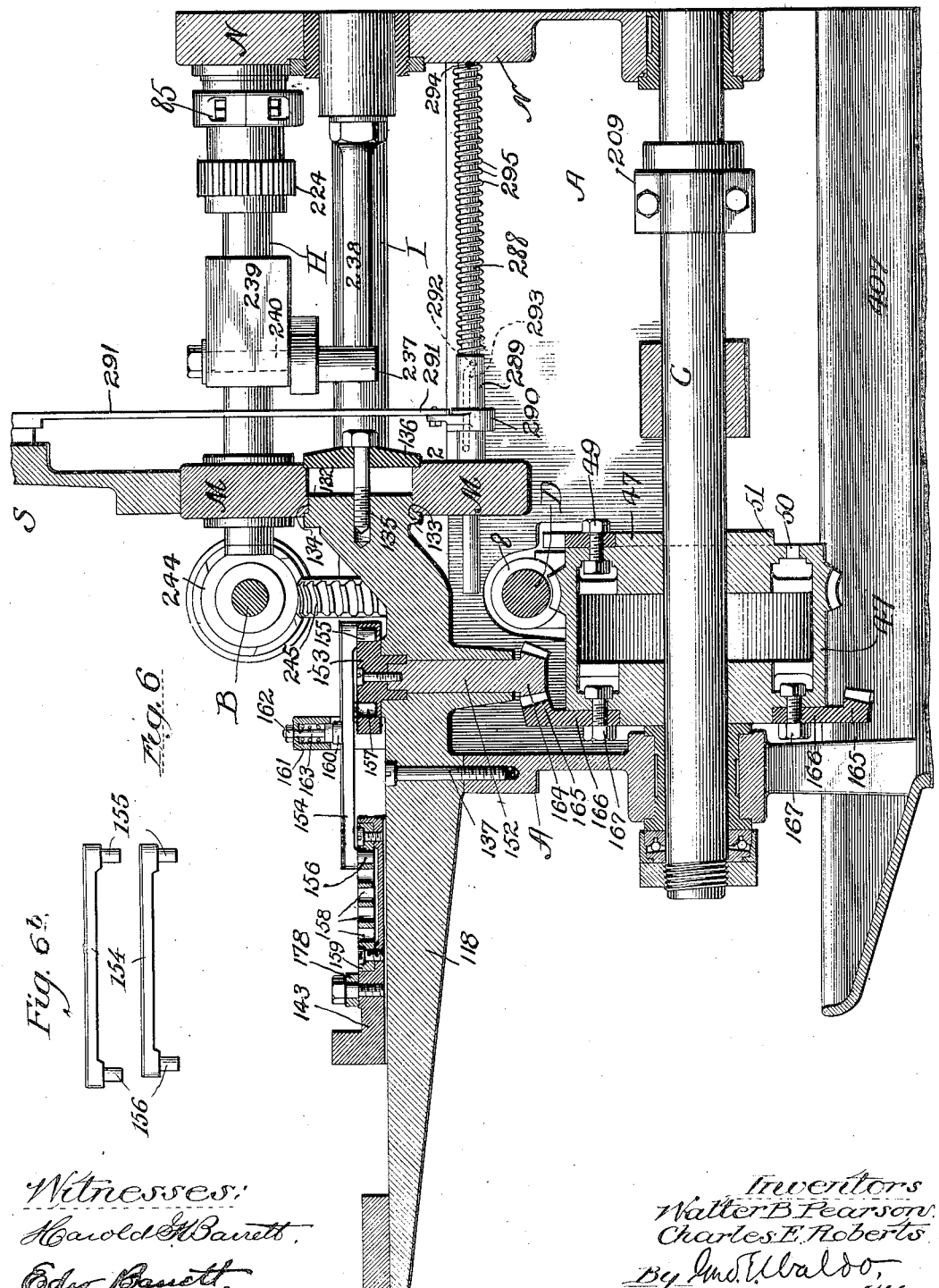

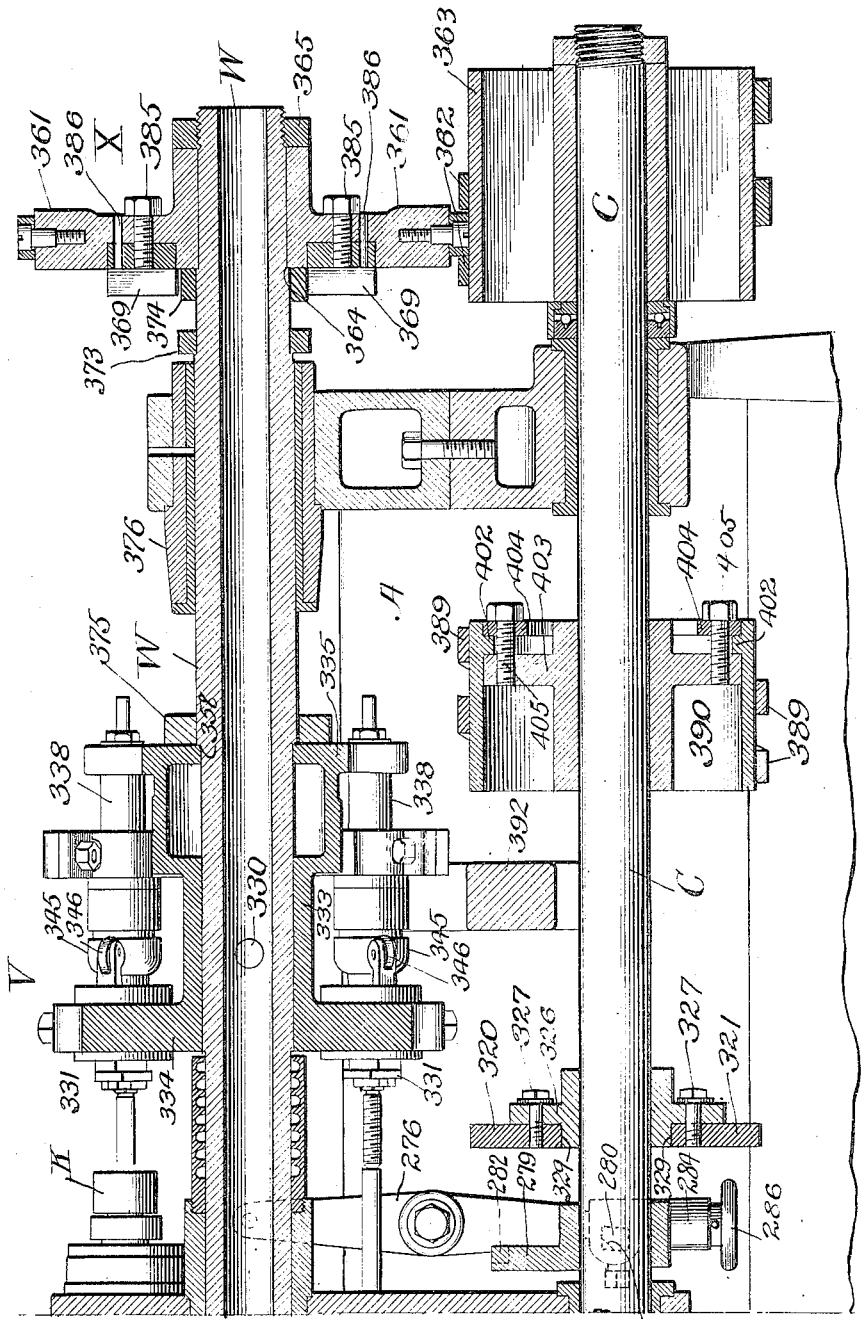

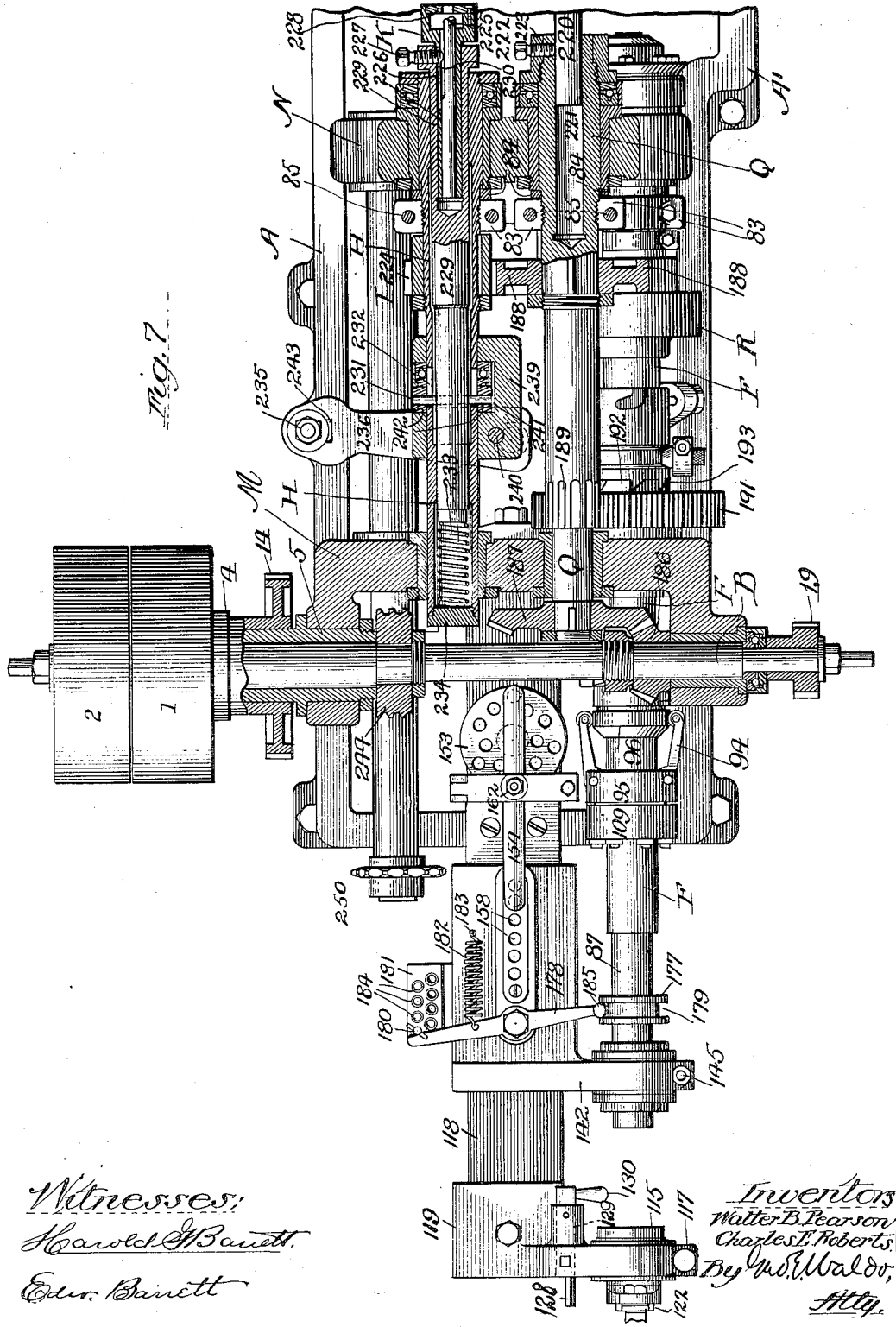

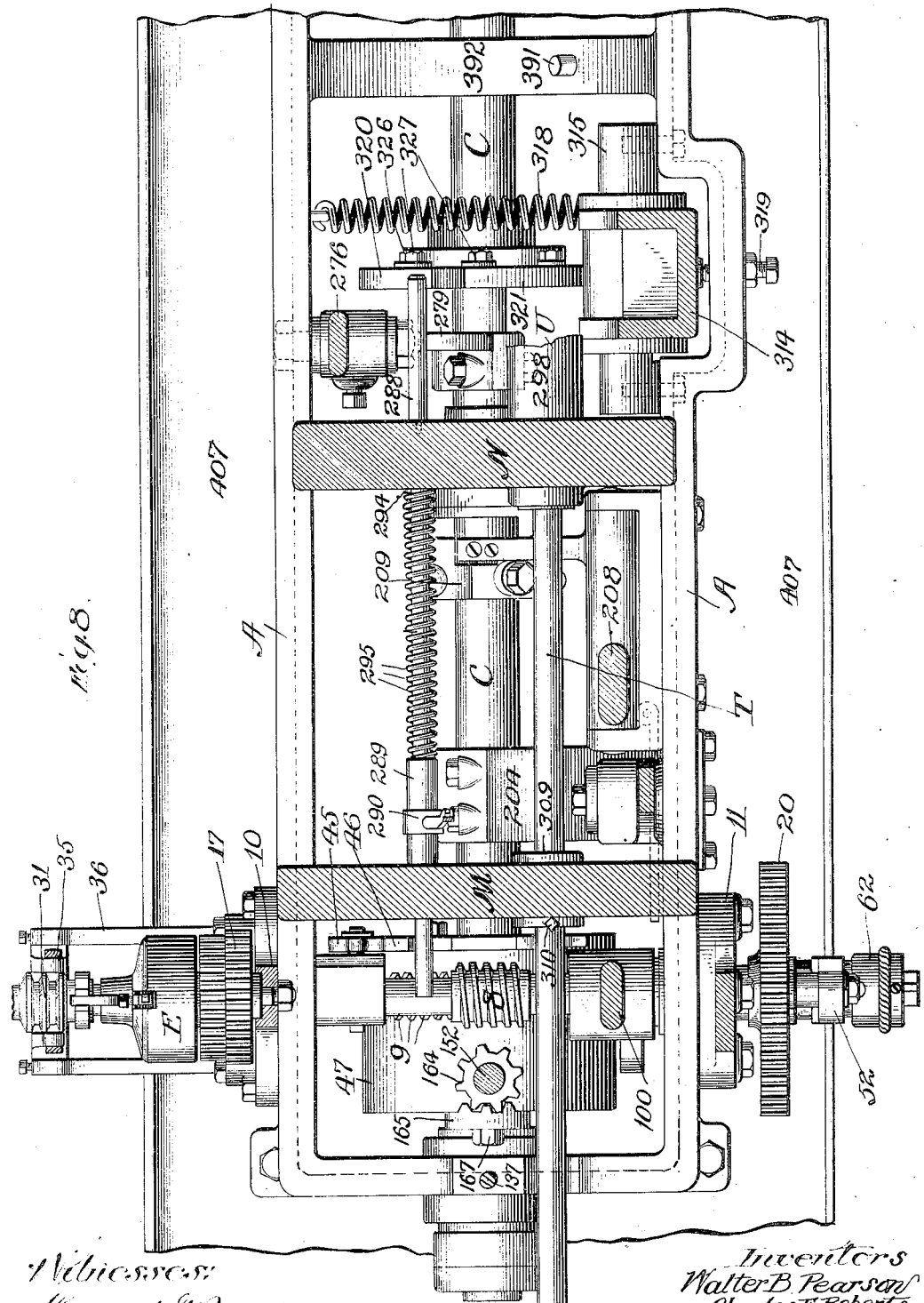

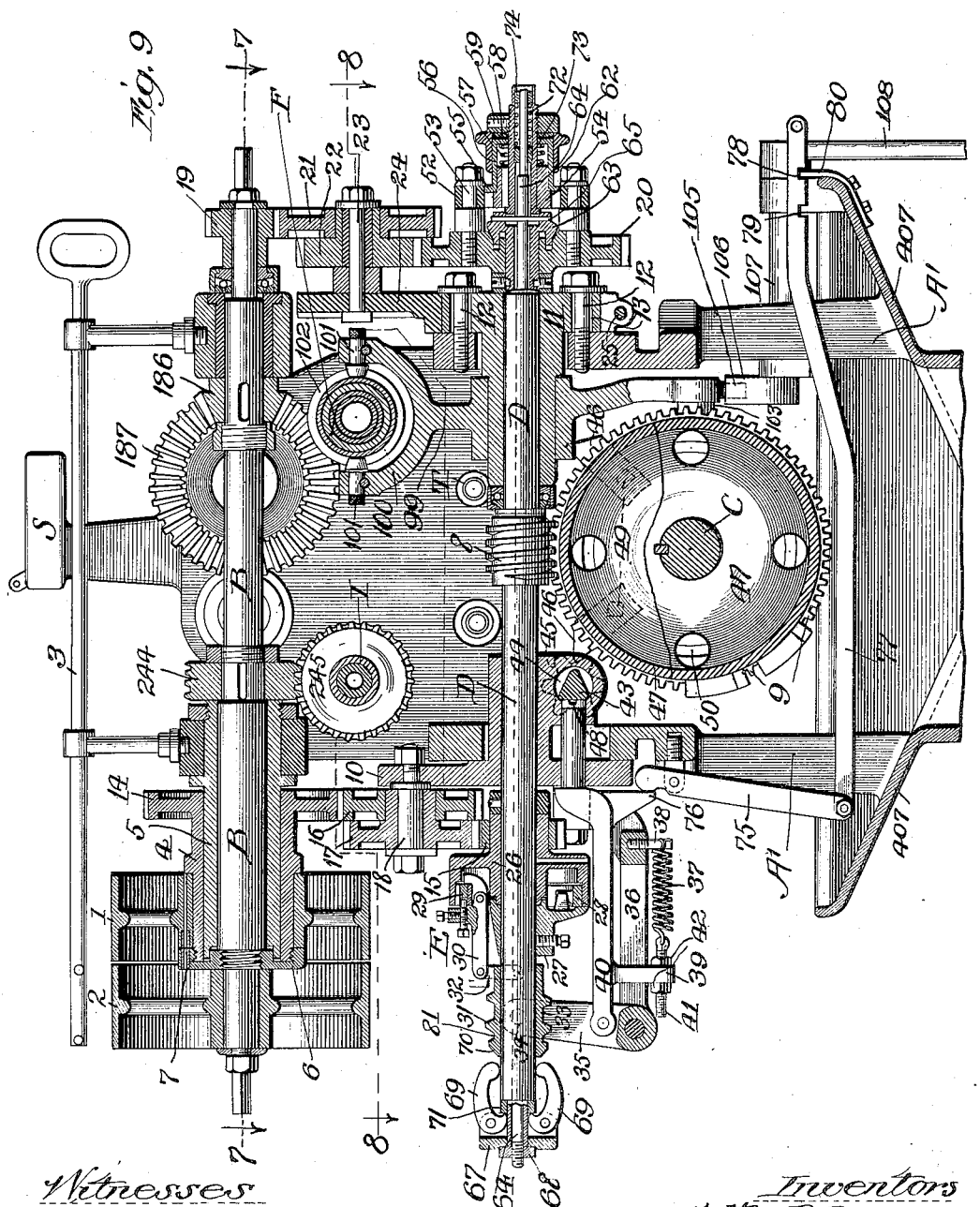

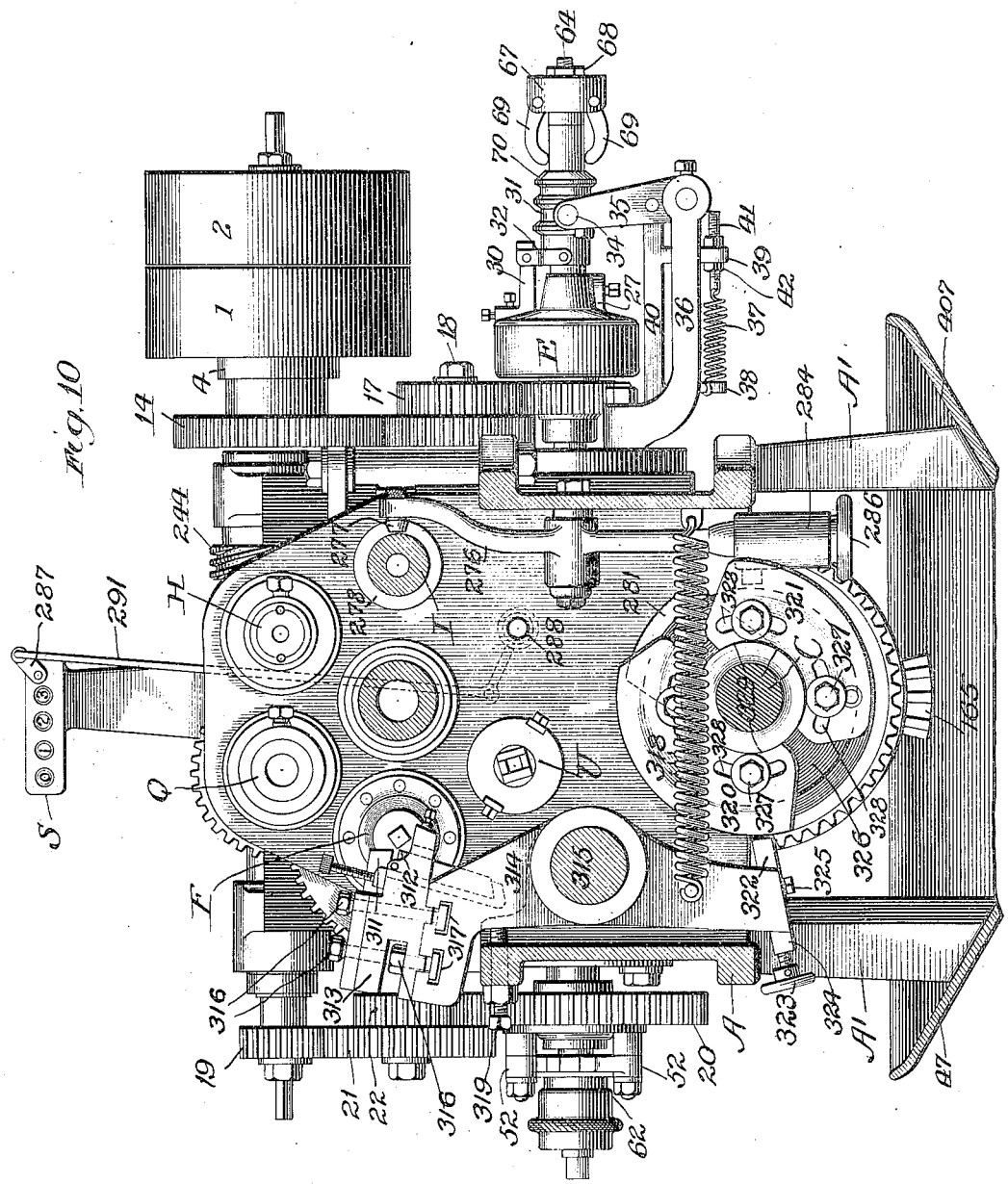

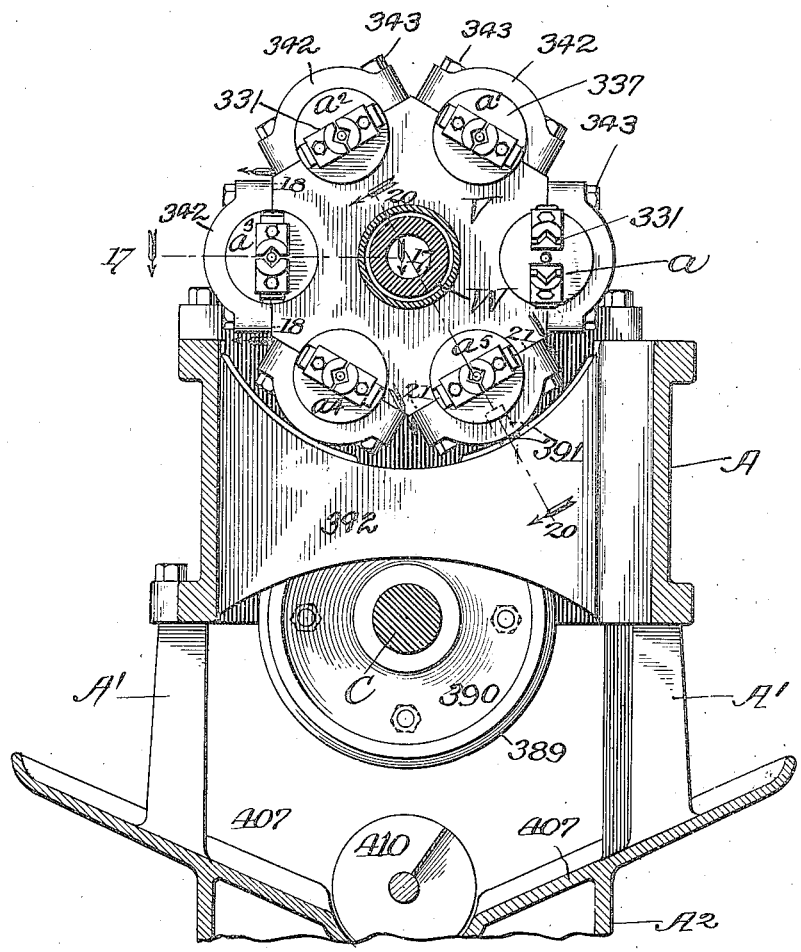

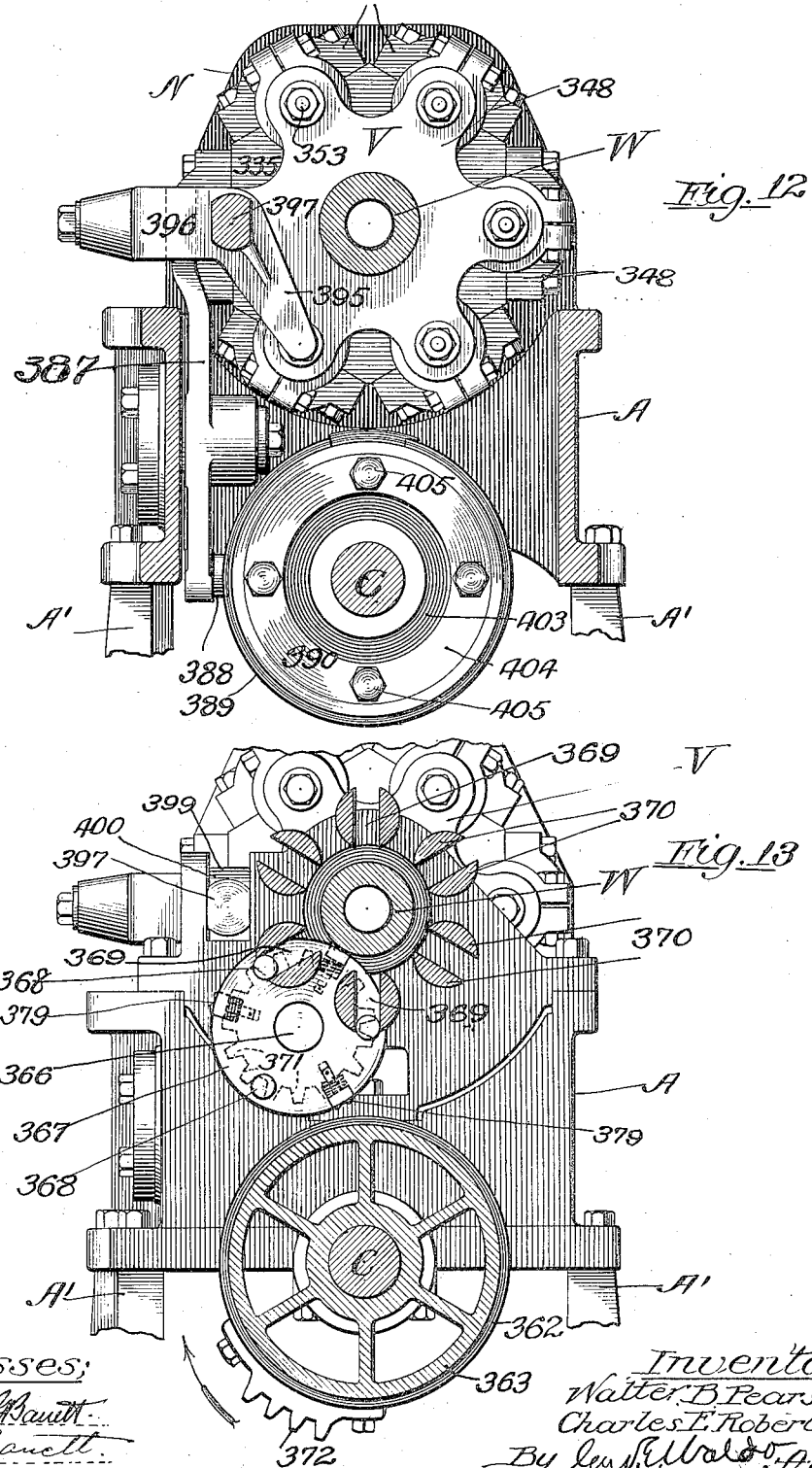

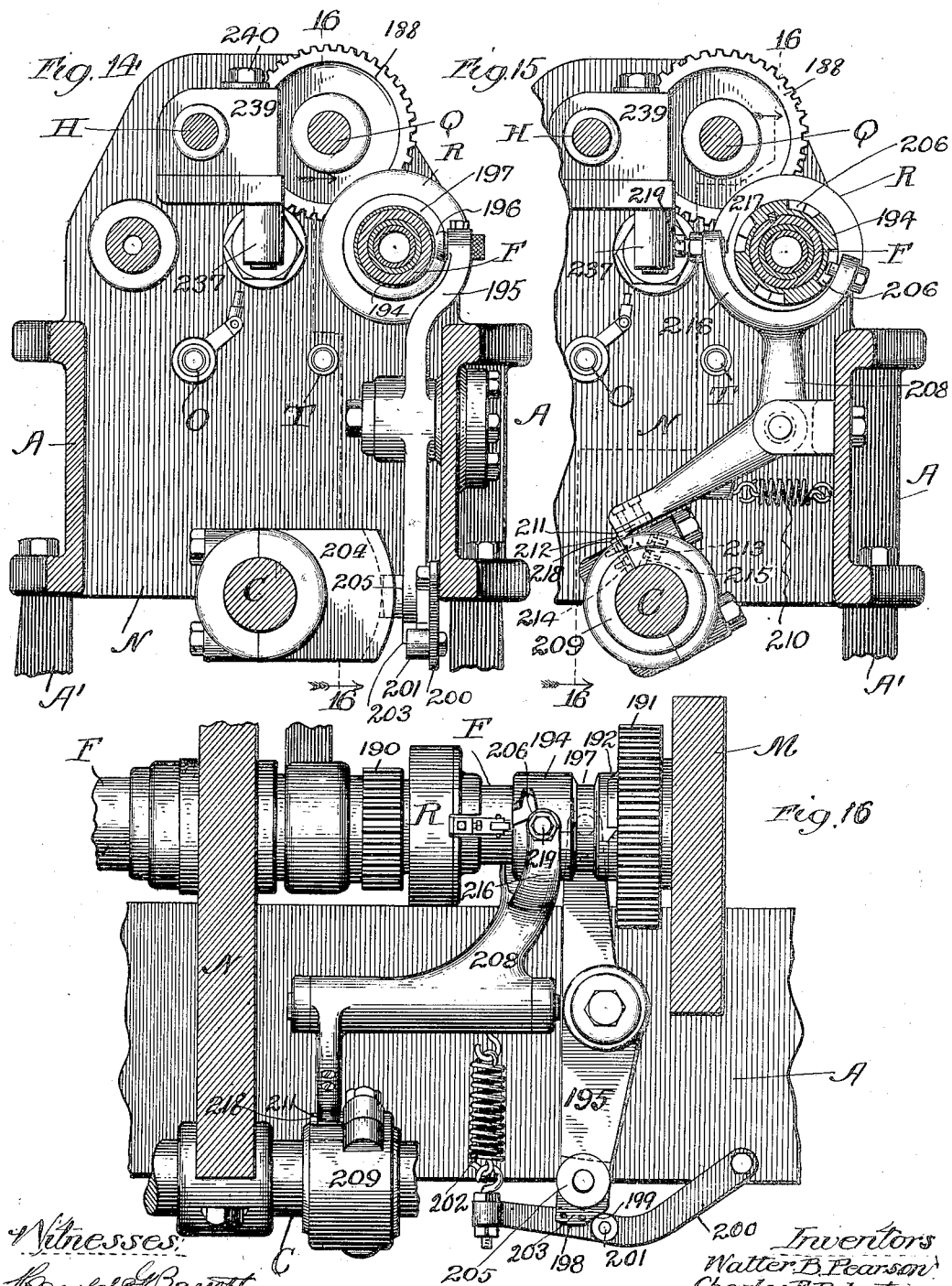

No. 827,463. PATENTED JULY 31, 1906.
W. B. PEARSON & C. E. ROBERTS.
SCREW MACHINE.
APPLICATION FILED MAY 9, 1902.
24 SHEETS—SHEET 17.
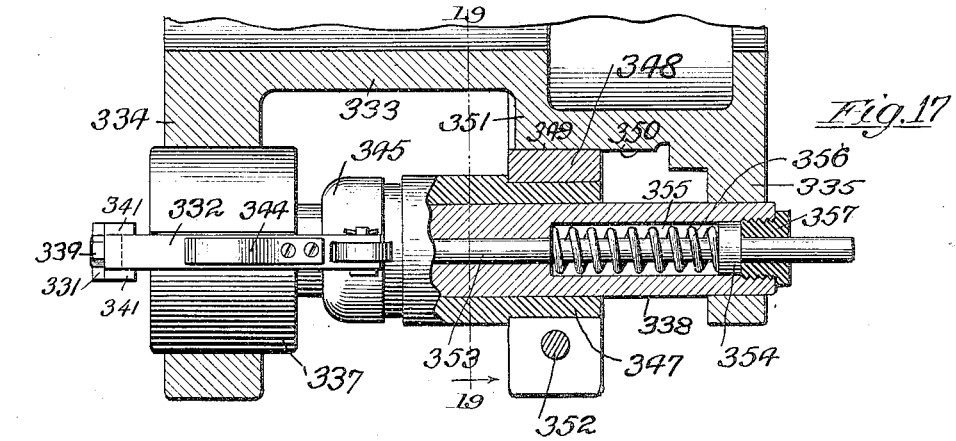
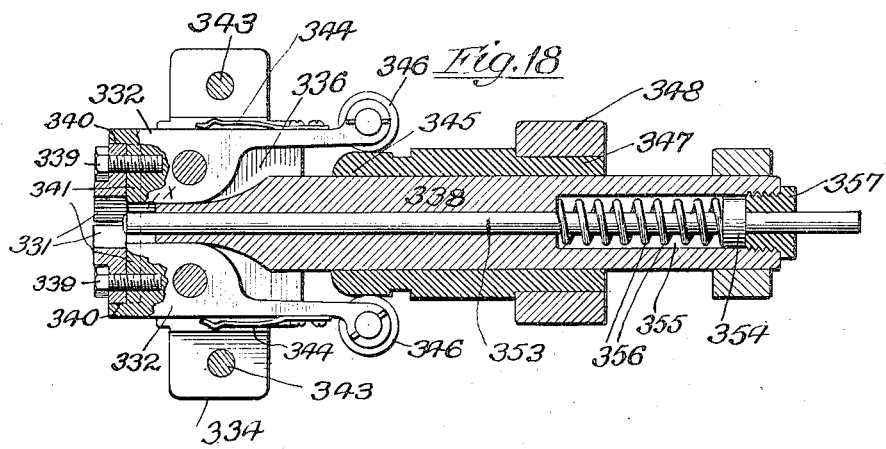
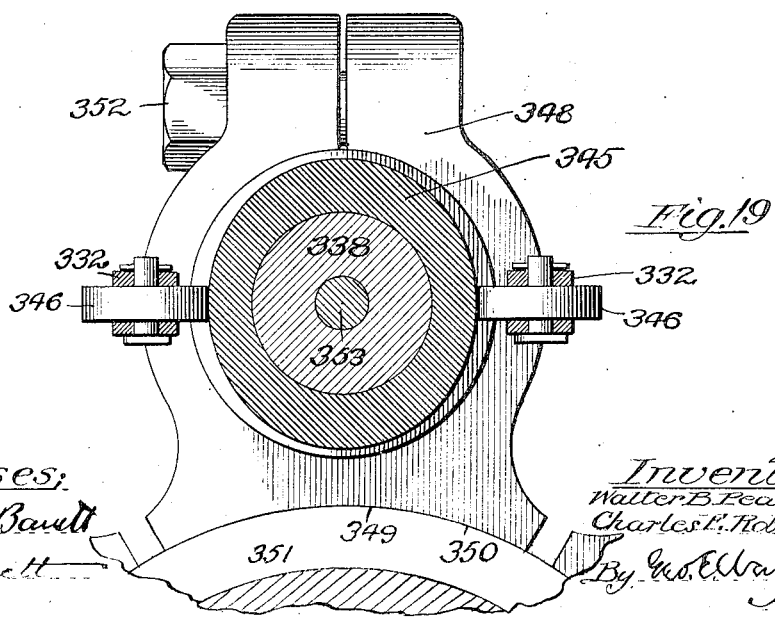

No. 827,463. PATENTED JULY 31, 1906.
W. B. PEARSON & C. E. ROBERTS.
SCREW MACHINE.
APPLICATION FILED MAY 9, 1902.
24 SHEETS—SHEET 18.
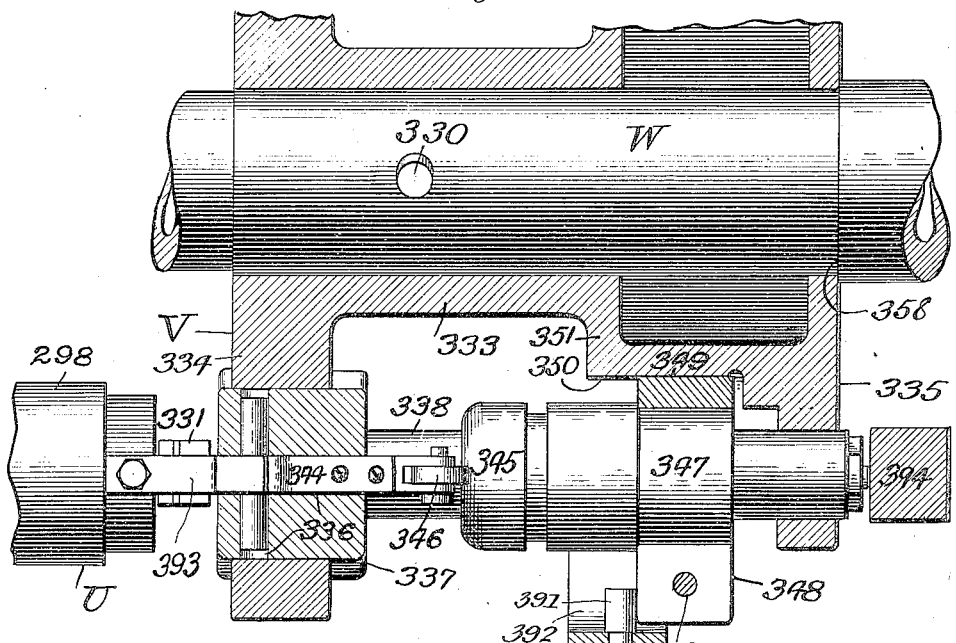
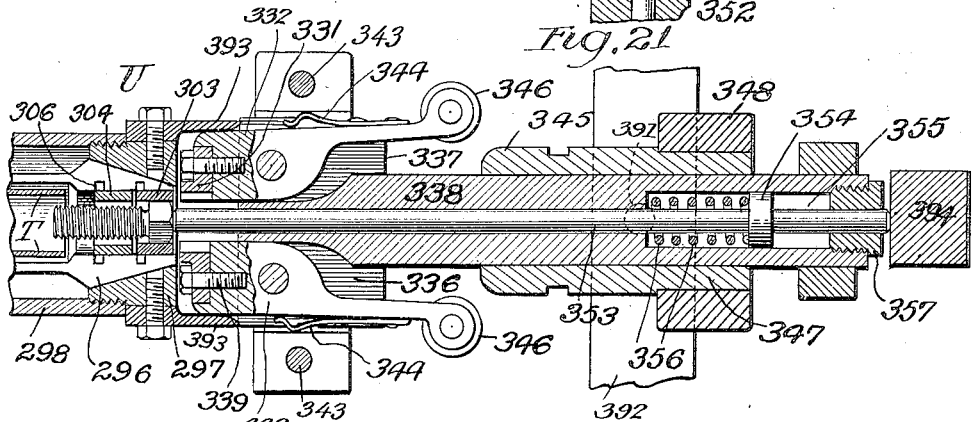
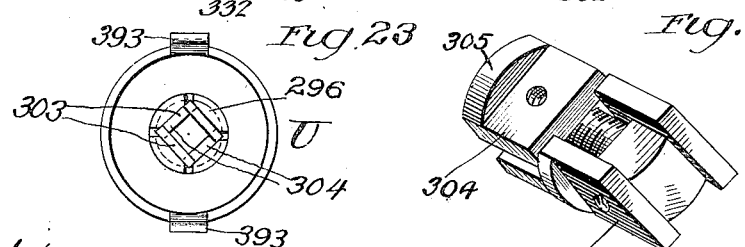
Witnesses
Harold J Barrett
Edw. Barrett
Inventors
Walter B Pearson
Charles E Roberts
By Jno E Waldo
Atty

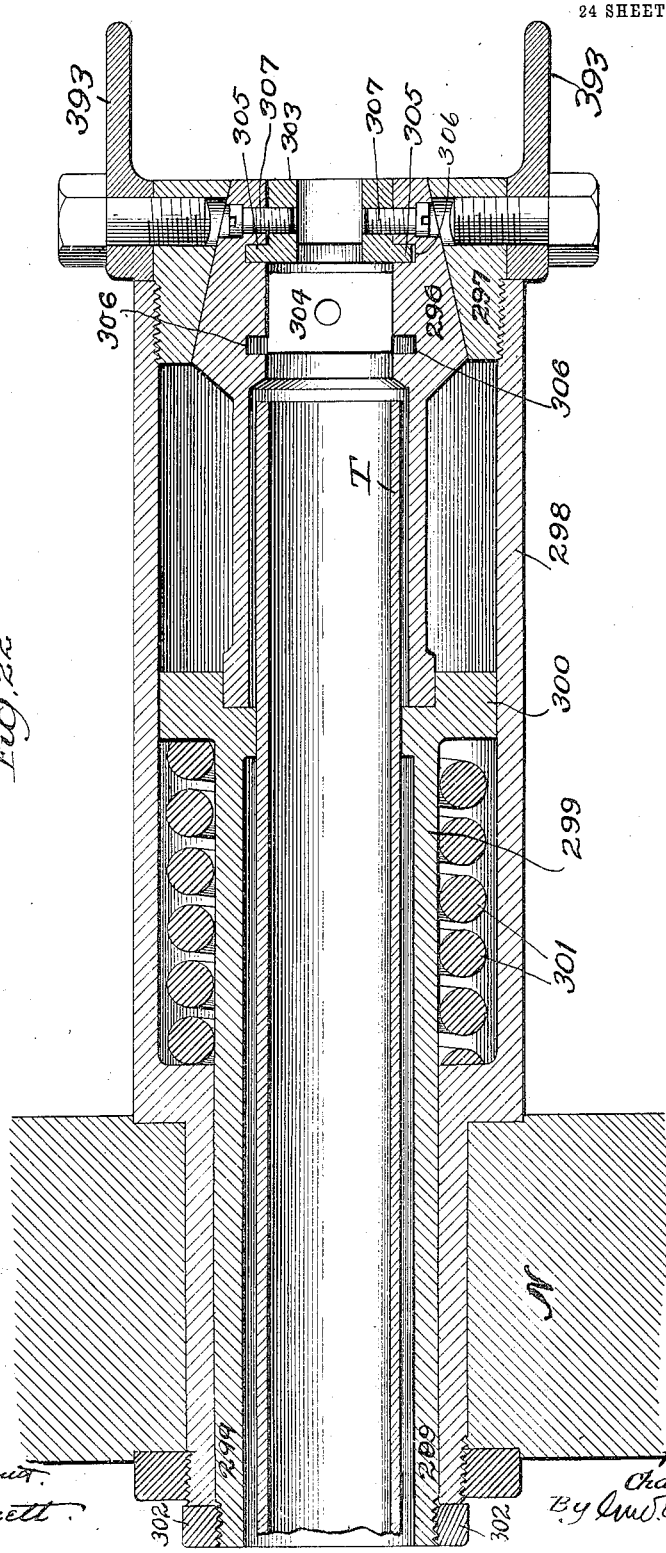

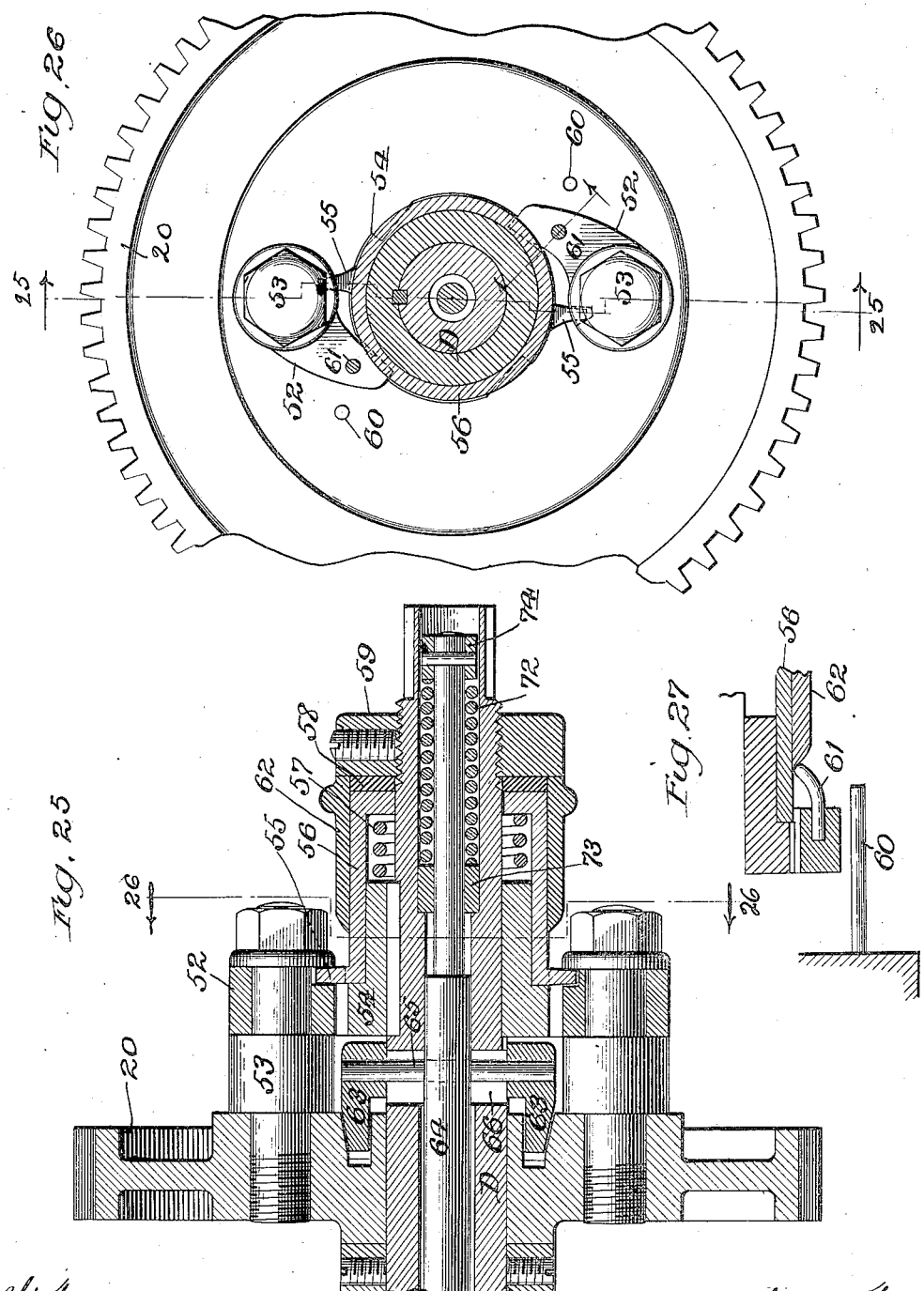

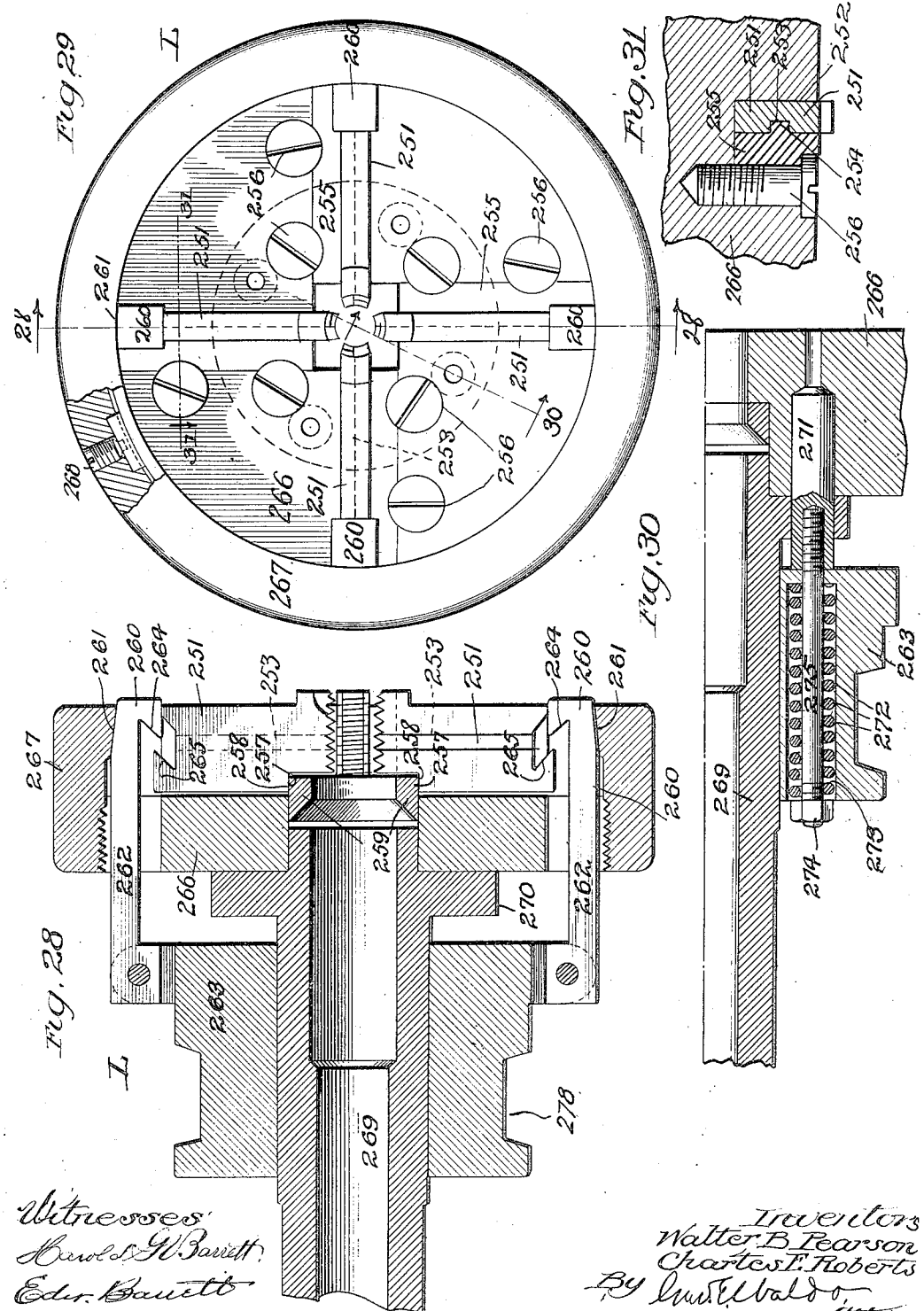

No. 827,463. PATENTED JULY 31, 1906.
W. B. PEARSON & C. E. ROBERTS.
SCREW MACHINE.
APPLICATION FILED MAY 9, 1902.
24 SHEETS—SHEET 22.
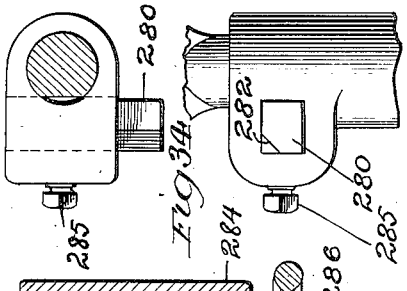
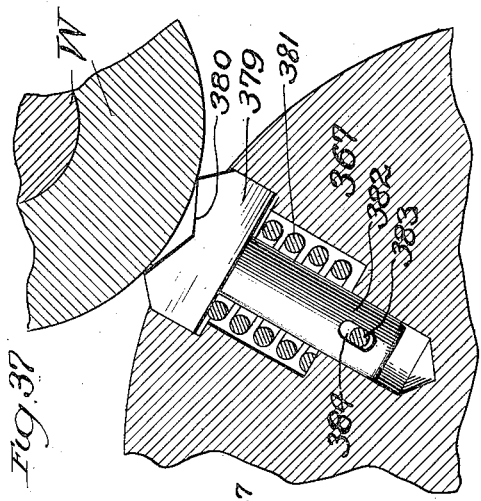
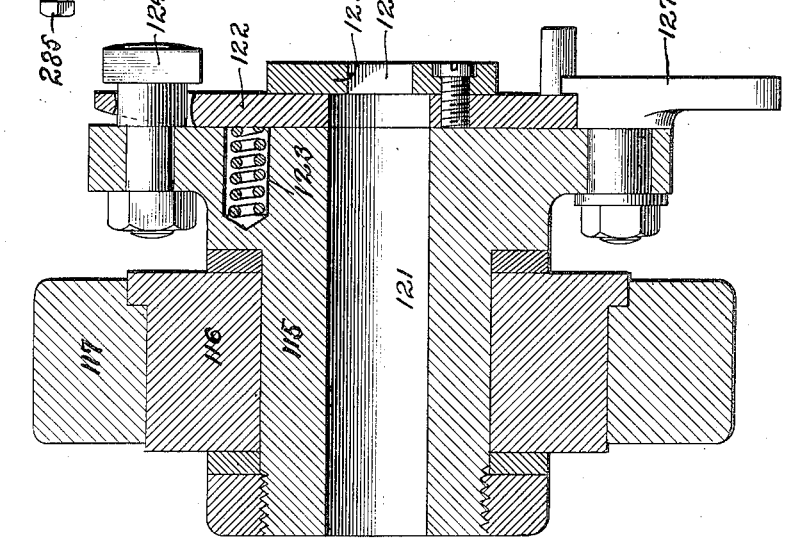
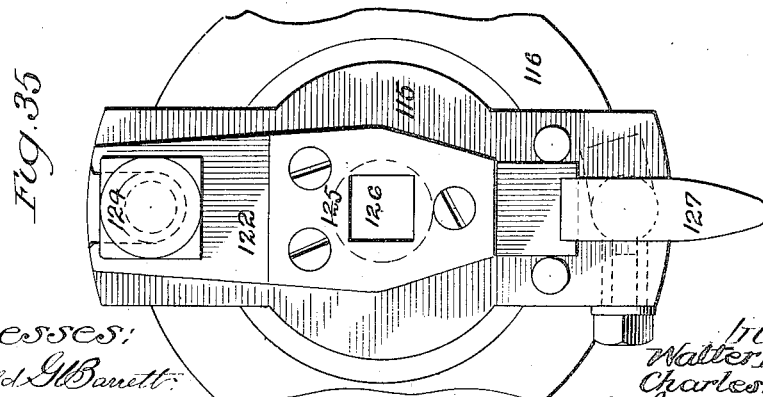
Witnesses:
Harold G. Barrett
Edw. Barrett
Inventors
Walter B. Pearson
Charles E. Roberts
By Geo. F. Waldo
Atty

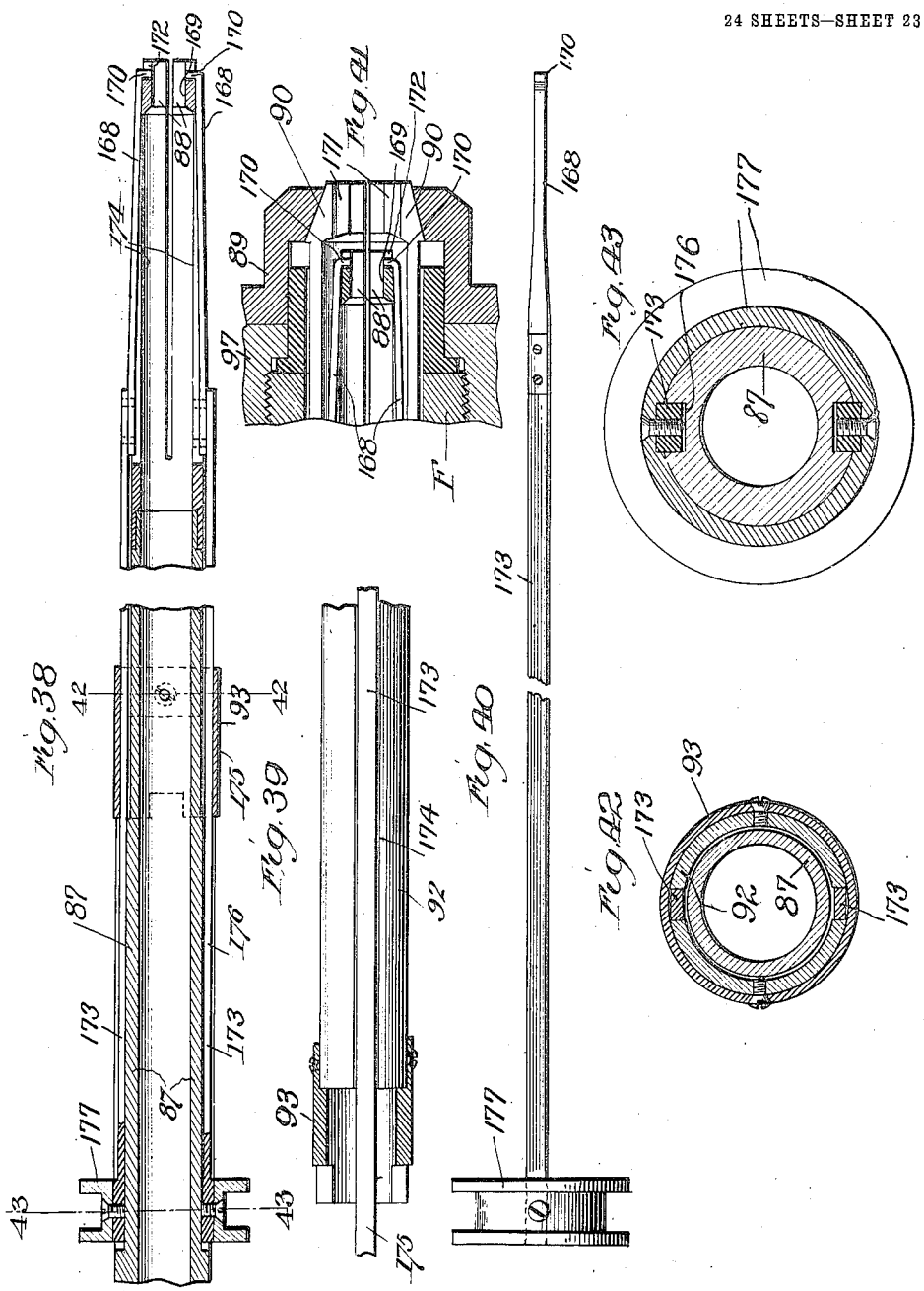

No. 827,463. PATENTED JULY 31, 1906.
W. B. PEARSON & C. E. ROBERTS.
SCREW MACHINE.
APPLICATION FILED MAY 9, 1902.
24 SHEETS—SHEET 24.
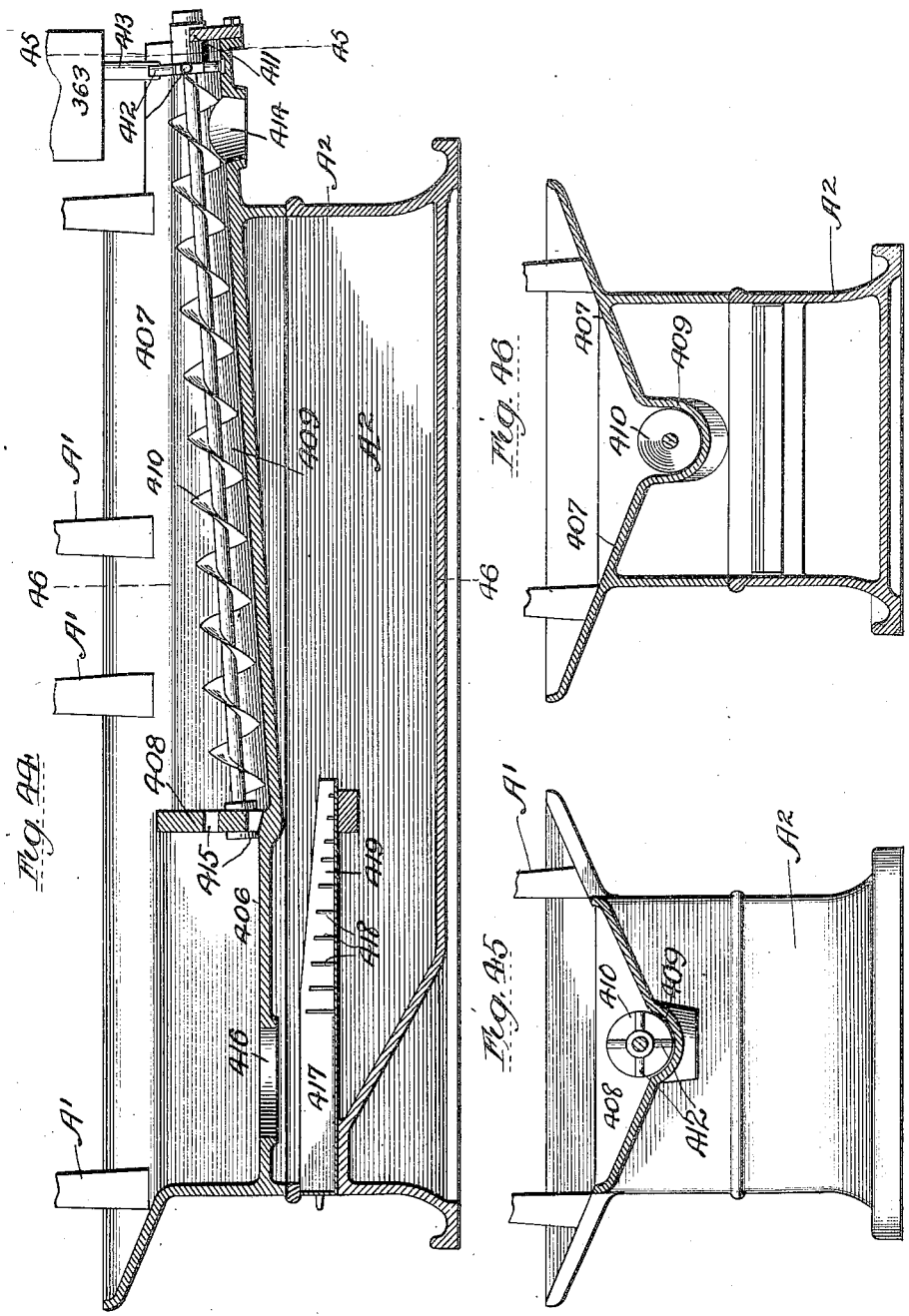
Witnesses:
Harold G. Barett
Edw. Barett.
Inventors
Walter B. Pearson
Charles E. Roberts
By Ino. E. Waldo,
Atty.

UNITED STATES PATENT OFFICE.

WALTER B. PEARSON AND CHARLES E. ROBERTS, OF CHICAGO, ILLINOIS, ASSIGNORS TO STANDARD SCREW COMPANY, OF DETROIT, MICHIGAN, A CORPORATION OF NEW JERSEY.

SCREW-MACHINE.

No. 827,463.      Specification of Letters Patent.      Patented July 31, 1906.

Application filed May 9, 1902. Serial No. 106,620.

*To all whom it may concern:*

Be it known that we, WALTER B. PEARSON and CHARLES E. ROBERTS, citizens of the United States, and residents of Chicago, in the county of Cook and State of Illinois, have invented certain new and useful Improvements in Screw-Machines, of which the following is a specification.

This invention relates to screw-machines, and relates particularly to machines for making metal screws, such as set-screws and cap-screws.

Primary objects of the invention are to provide a machine of this type which will have a very large capacity and to avoid the waste of stock due to the method of severing the screw-blanks now in common use.

To effect the object of the invention as it relates to avoiding the waste of stock in severing blanks, the invention consists of means for partially severing a blank from a bar of stock by cutting a groove in the bar of stock at the desired point of severance of a blank therefrom, the bottom of said groove being angular or V-shaped, and means for turning said partially-severed blank and the bar of stock relatively to each other.

The process of severing blanks from a bar of stock, consisting in first partially severing a blank from the bar of stock by grooving said bar of stock at the desired point of severance of a blank therefrom, the bottom of the groove being angular or V-shaped, and in then turning said partially-severed blank and the bar of stock upon their common axis relatively to each other, is fully described and claimed in our United States Letters Patent No. 732,218, dated June 30, 1903. The improved means for severing metal bars in accordance with our improved process has also been made the subject of a separate application filed by us as a division of the present application on September 9, 1904, Serial No. 223,881.

A machine of our invention also consists of the various other features, combinations of features, and details of construction hereinafter described and claimed.

In the accompanying drawings a machine of our invention is fully illustrated.

Figure 1 is a front view of a machine of our invention. Fig. 2 is a top plan view thereof. Figs. 3 and 4 are respectively right and left hand end views thereof. Figs. 5, 5ª, and 5ᵇ together comprise a horizontal sectional view of the machine on the line 5 5 of Fig. 1, the lines of division lengthwise of the machine being indicated by the lines 5ª and 5ᵇ. Figs. 6 and 6ª together comprise a vertical longitudinal sectional view on the line 6 6 of Fig. 2, the line of division lengthwise of the machine being defined by the line 6ª. Fig. 6ᵇ is a detail view. Fig. 7 is a partial plan section on the line 7 7 of Fig. 9. Fig. 8 is a partial plan section on the line 8 8 of Fig. 9. Fig. 9 is a transverse vertical section on the line 9 9 of Fig. 1. Figs. 10 and 11 are vertical sectional elevations, both taken on the line 10 10 of Fig. 2 and looking, respectively, toward the left and right hand ends of the machine as viewed in Fig. 1. Figs. 12, 13, 14, and 15 are respectively vertical sectional elevations taken on the lines 12 12, 13 13, 14 14, and 15 15 of Fig. 1, respectively, looking in the directions indicated by the arrows. Fig. 16 is a partial sectional elevation on the line 16 16 of Figs. 14 and 15. Figs. 17, 18, 19, 20, and 21 are enlarged detail views of the blank-supporting chucks and adjunctive parts, taken on the lines 17 17, 18 18, 19 19, 20 20, and 21 21, respectively, of Figs. 11 and 17. Fig. 22 is an enlarged sectional view of the broach, showing also a portion of the discharged tube. Fig. 23 is an end view of the broach. Fig. 24 is a perspective view of the broaching-cutters. Figs. 25, 26, and 27 are enlarged detail views of the slow-driving connection on the lines 25 25 of Fig. 26, 26 26 of Fig. 25, and 27 27 of Fig. 26, respectively. Figs. 28, 29, 30, and 31 are enlarged detail views of the threading-die, Figs. 28, 30, and 31 being sectional views on the lines 28 28, 30 30, and 31 31, respectively, of Fig. 29. Figs. 32, 33, and 34 are enlarged detail views of the threading-die-operating lever. Figs. 35 and 36 are enlarged detail views of the stock-retaining device of the auxiliary feed mechanism. Fig. 37 is an enlarged detail section of the converting-disk, showing the means for preventing overvarying thereof. Figs. 38, 39, 40, 41, 42, and 43 are enlarged detail sectional views of the ejector-fingers and adjunctive parts, Figs. 42 and 43 being taken on the lines 42 42 and 43 43, respectively, of Fig. 38. Fig. 44 is a vertical longitudinal mid-section of the machine, and Figs.

45 and 46 are sectional views on the lines 45 45 and 46 46 of Fig. 44.

The frame of the machine consists of a bed A, which is supported on posts or pillars A', which extend upwardly from a base A², the sides and bottom of which are inclosed and which has an outwardly-projecting flange around its upper edge, thus forming a pan adapted to receive the oil which runs off from the tools and the chips formed thereby.

The operative parts of the machine are driven from a transverse shaft B and a longitudinal shaft C, of which the shaft B is driven directly from a suitable source of power by means of a belt (not shown) applied to a driving-pulley thereon, and the shaft C is driven by means of suitable driving connection with the shaft B. As shown, the shaft B is provided with a fast pulley 1 and a loose pulley 2, to which the driving-belt may be shifted by means of a shipping-rod 3 when it is desired to stop the machine, all in a familiar manner. In the preferable construction shown the fast pulley 1 instead of being secured directly to the shaft B is mounted upon and is connected to a sleeve 4, (see Fig. 9,) which in turn is revolubly mounted upon an extension of the bearing-box 5 of said shaft B. As shown, said fast pulley 1 is connected to the sleeve 4 in the following manner: Threaded to the end of the sleeve 4 and to the shaft B, so that said sleeve will rotate with said shaft, is a cap 6, which is rigidly connected to the fast driving-pulley 1 by means of a pin 7, which is fitted to a suitable hole formed in said cap and in the hub of said pulley. The pin 7 is of such size that it will drive the operative parts of the machine under normal conditions, but will break or shear when subjected to an unusual or extraordinary strain, allowing said pulley 1 to turn freely on its bearing, and thus relieve the shaft B from all strain therefrom. A safety device is thus formed, designed, and adapted to release the operative parts of the machine from the driving power in case any of the tools catch or from other cause delicate parts of the machine are liable to be broken or injured by an undue strain thereon. As shown also, the bearing-box 5 of said shaft B extends through the sleeve 4. The advantage of this construction is that said box will receive and sustain substantially the entire strain due to the pull of the driving-belt and will correspondingly relieve the shaft B therefrom.

The shaft C is driven by means of suitable driving connection with the power-shaft B. As shown, (see particularly Fig. 9,) the driving connection between said shafts B and C is as follows: Revolubly mounted in suitable bearings in the bed A of the machine is a shaft D, secured to which is a worm 8, which engages a worm-gear 9, secured to said shaft C. To provide for assembling and adjusting the worm 8 relatively to the worm-gear 9, the bearings for the shaft D are formed in plates 10 and 11, which are secured to the bed A by means of bolts 12, which pass through openings 13 therein and are threaded into the machine-bed A. The holes 13 are larger than the bolts 12, thus making provision for adjusting the shaft D, carrying the worm 8, toward and from the worm-gear 9 in the desired manner. As shown, the shaft D is driven from the shaft B by suitable trains of gears. For reasons hereinafter apparent two trains of gears are provided adapted to drive said shaft D at relatively fast and slow speeds. The fast driving-train comprises relatively large and small gears 14 and 15, secured to the shafts B and D, respectively, and connected intermediate gears or pinions 16 and 17, revolubly mounted on a stud 18, secured in the frame of the machine, which respectively mesh with the gears 14 and 15. The slow driving-train comprises relatively small and large gears 19 and 20, secured to the shafts B and D, respectively, and connected intermediate gears or pinions 21 and 22, which are revolubly mounted on a stud 23 and which respectively mesh with the gears 19 and 20 on the shafts B and D. In the preferable construction shown the stud 23 is secured in a swinging arm 24, revolubly mounted on a suitable bearing on the plate 11 and adapted to be secured in any desired angular adjustment thereon by a clamping-bolt 25. Provision is thus made for changing the gears 21 22 to vary the slow speed of the shaft D. To provide for driving said shaft D at different rates of speed, the gears 15 and 20 are normally loose on said shaft and are adapted to be secured thereto by suitable means when desired. As shown, the gear 15 is adapted to be secured to said shaft D by means of a suitable friction-clutch. The clutch shown in the drawings (designated as a whole by the reference-letter E) comprises a section 26, mounted so as to rotate freely on said shaft D, a section 27, rigidly secured to said shaft, a split friction-ring 28, adapted to engage a suitable seat or bearing on the loose clutch member 26, a wedge 29, adapted to expand said friction-ring into engagement with the seat or bearing on said loose clutch member, a lever 30, pivoted upon the clutch member 27, a projection on said lever, preferably consisting of a screw threaded through a lug on said lever adapted to expand said friction-ring into engagement with the seat or bearing on said loose clutch member 26 when the lever 30 is moved pivotally in the proper direction, and a sleeve 31, longitudinally movable on the shaft D, to which the end of the lever 30 is connected by means of a link 32. Movement of said sleeve 31 longitudinally of said shaft D will thus impart pivotal movement to the lever 30 to effect engagement and disengagement of the friction-ring 28 with the seat or bearing on the loose clutch member 26 in an obvious and familiar manner. The gear 15 is rigidly secured to the loose clutch member 26 and will thus be locked to the shaft D or released therefrom by the operation of said clutch.

A spring applied to the clutch E operates to maintain the same normally locked, and thus to secure the gear 15 rigidly to the shaft D and to maintain the fast driving-train normally in operative engagement with said shaft. In the specific construction shown said clutch is controlled in the following manner: Formed in the exterior surface of the sleeve 31 is a peripheral groove 33, which is engaged by pins 34, secured in the free ends of lever-arms 35, pivotally supported upon a bracket 36 on the machine-frame. The clutch E is maintained normally locked by a spring 37, the opposite ends of which are attached to a pin 38 in the bracket 36 and to a lug or projection 39 on a rod 40, one end of which is pivotally connected to the lever-arms 35 and the other end of which is fitted to and longitudinally movable in a suitable bearing in the plate 10. In order to provide for regulating the tension of the spring 37, it is connected to the projection 39 by means of an eyebolt 41, to which nuts 42 are threaded on opposite sides of the projection 39. With this construction it is obvious that said spring 37 will maintain the clutch E normally locked and the fast driving-train normally in engagement with the shaft D.

The fast driving-train of gears is designed and adapted to be disengaged from the shaft D at desired predetermined intervals by suitable means. As shown, said means consist of what may be called a "triangular" cam 43 on a stub-shaft 44, revolubly mounted in a suitable bearing in the plate 10. The cam 43 is located closely adjacent to the end of the rod 40, its position being such that when a side of said cam is parallel with the end of said rod said rod will be free to move inwardly under the influence of the spring 37 to lock the clutch E in the manner heretofore described. The dimensions of the cam 43 are such, however, that as said cam is rotated the corners thereof will come into contact with the end of said rod 40 and will operate to move it outwardly a sufficient distance to disengage the clutch E, and thus disengage the fast driving-train of gears from the shaft D. As shown, intermittent rotary motion is imparted to said cam by means of a star-wheel 45, secured to the shaft 44, the teeth of which project into the path of travel of projections 46 on a drum 47, secured to the shaft C, the relation of parts shown being such that each of the said projections will rotate said star-wheel 45 through sixty degrees or one-sixth (⅙) of a revolution. Starting with the cam in the initial position shown in Fig. 9 of the drawings, it is obvious that rotation of the star-wheel under the influence of a projection 46 will rotate said cam sixty degrees and will bring a corner of said cam into engagement with the end of the rod 40, and thereby disengage the clutch E. To maintain the cam 43 in position with the corners thereof in contact with the rod 40, a notch 48 is formed in the end of said rod adapted to be engaged by the corners of said cam. Subsequent actuations of said cam 43 by the projections 46 will operate to effect engagement and disengagement of the clutch E.

To provide for regulating the intermittent rotation of the star-wheel 45, and thus of the cam 43, the projections 46 on the drum 47 are formed separate from said drum and are adjustable circumferentially thereof. In the specific construction shown said projections 46 are secured to said drum by means of bolts 49, which extend through a T-slot 50, formed in said drum, the inner ends of said projections 46 being circular and being fitted to a circular shoulder formed on said drum. With this construction it is obvious that rotation of the shaft C will impart an intermittent rotary motion to the cam 43 and will effect alternate engagement and disengagement of the clutch E in the desired manner and that the times and intervals of engagement and disengagement of said clutch may be varied as desired by properly adjusting the projections 46 on the drum 47.

The gear 20 of the slow driving-train is connected to the shaft D by means of pawls 52, pivotally mounted on studs 53, secured in said gear, which are adapted to engage the teeth of a ratchet-wheel 54, keyed or otherwise rigidly secured to the shaft D. As shown, (see particularly Figs. 25, 26, and 27,) the pawls 52 are adapted to be moved pivotally upon the studs 53 to effect engagement and disengagement of said pawls with the teeth of the ratchet-wheel 54 by means of teeth or projections 55 on a friction-ring 56, revolubly mounted on a hub or extension of said ratchet-wheel 54, which engage corresponding teeth or notches on the hubs of said pawls. As shown also, frictional resistance to the rotary movement of the ring 56 is provided by means of a spring 57, inserted between the end of said ring 56 and the adjacent face of the ratchet-wheel hub, which operates to force said ring 56 outwardly into frictional engagement with a fiber washer 58, inserted between the outer end of said ring and a nut 59, threaded to the end of the shaft D. With this construction it is obvious that when the shaft D is rotating under the influence of the fast driving-train it will tend to rotate the friction ring or collar 56 faster than the gear 20 of the slow driving-train and will thus throw the pawls 52 outwardly, so that they will not run over the teeth of the ratchet-wheel 54, and will thus prevent all noise due to this cause. When, however, the fast driving-train is disengaged from the shaft D, leaving said shaft free to rotate under the influence of the slow driving-train, the shaft D will very soon lose its momentum and will rotate at a slower rate of speed than the gear-wheel 20. When said shaft D rotates slower than the gear 20, the projections on the friction-ring 56 will throw the pawls 52 inwardly into engagement with the teeth of the ratchet-wheel 54 and will cause said shaft D to rotate with said gear 20. Stops or pins 60 limit the outward movement of the pawls 52. Provision is also made for locking or securing the pawls 52 out of engagement with the ratchet-wheel 54 when for any reason this may be desired, as when for any reason it may be desired to turn the machine backward. As shown, said means consist of pins 61, secured in said pawls, which are adapted to be forced outwardly to effect disengagement of said pawls from the teeth of the ratchet-wheel 54 by means of an inclined surface or wedge on a sleeve 62, which is fitted to and is longitudinally movable toward and from said pawls on the exterior surface of the friction-ring 56 as a bearing. The sleeve 62 is designed to be moved only by hand as occasion may arise.

It is found in practice that when the shaft D is released from the fast driving-train under the influence of which it has been rotating its momentum causes it to make one or more revolutions at a higher rate of speed than the slow driving-train. This is objectionable, for the reason that as soon as released from the fast driving-train it is desirable in order to secure the designed operation of various mechanisms that the speed of rotation of said shaft should at once fall to that of the slow driving-train. As shown, a brake is provided adapted to check the rotation of said shaft D as soon as it is released from the fast driving-train. In the preferable construction shown (see Figs. 9 and 25) said brake consists of a ring 63, which is fitted to and is longitudinally movable on the shaft D toward and from the gear 20 and is provided with a tapered surface adapted to engage a correspondingly-tapered seat on said gear. Engagement and disengagement of said tapered ring 63 with its seat in the gear 20 is effected automatically by movement of the sleeve 31, which controls the clutch E, in the following manner: The shaft D is hollow, and extending through the same is a rod 64, to which the brake-ring 63 is secured by means of a pin 65, which passes through an elongated slot or opening 66 in said shaft D. Loosely fitted to a reduced portion of the shaft D at the opposite side of the machine is a ring 67, which bears against a nut 68, threaded to the rod 64. Pivoted upon said ring 67 are bell-levers 69, the long arms of which extend into close proximity to the sleeve 31 and are adapted to be forced outwardly by means of an inclined surface or wedge 70 on said sleeve as said sleeve is moved to release the clutch E. The opposite ends of the bell-levers 69 bear against a hardened thrust-ring 71, which abuts against a shoulder on the shaft 10 in such manner that as the bell-levers 69 are forced apart by the wedge 70 on the sleeve 31 they will exert a strong thrust against the end of said ring 71, which will operate to force the ring 67 outwardly and to exert a strong pull on the rod 64, tending to draw the brake-ring 63 into engagement with its seat on the gear 20, checking the shaft D in the desired manner. The nut 68 affords convenient means for adjusting the strength of the engagement of the brake-ring 63. A spring 72, inserted between a collar 73, which bears against an interior shoulder on the shaft D, and a nut 74, threaded to the end of the rod 64, operates to disengage the brake-ring 63 from the gear 20 as soon as the bell-levers 69 are released by the wedge 70, thus leaving said shaft free to rotate under the influence of the fast driving-train and preventing any jar which might be caused if said fast driving-train were thrown in while the brake-ring 63 was seated in the gear 20.

In the preferable construction shown means are provided whereby the fast driving-train may be disengaged from the shaft D and the brake-ring 63 from the gear 20 and maintained in disengagement therefrom when for any reason this may be desired. As shown, said means are as follows: Pivoted between its ends upon the machine-frame is a lever 75, one end of which is adapted to bear against a projection 76 on the rod 40 and to move said rod so as to disengage the clutch applied to the fast driving-train when pivotal movement in the proper direction is imparted to said lever 75. Pivoted to the opposite end of said lever 75 is a rod 77, in which are formed notches 78 and 79, adapted to engage a catch 80 on the machine-frame, the relation of parts being such that when the notch 78 is in engagement with the catch 80 the rod 40 will be free to move to effect engagement and disengagement of the clutch E and of the brake-ring 63 and when the notch 79 is in engagement with said catch 80 that said rod 40 will be moved outwardly to disengage said clutch E. To provide for disengagement of the brake-ring 63, which would otherwise be locked by the movement of the ring 31, caused by the outward movement of the rod 40, a peripheral groove 81 is formed on said sleeve, into which the ends of the bell-levers 69 will drop when the notch 79 in the rod 77 is in engagement with the catch 80, the relation of parts being such that when the ends of the bell-levers 69 are in engagement with said groove 81 the rod 64 will be free to move under the influence of the spring 72 to disengage the brake-ring 63 from the gear 20 in the desired manner. The throw of the cam 43 is such, however, that the rod 40 will be moved thereby only a sufficient distance to bring the ends of the bell-levers 69 into engagement with the surface of the sleeve between the wedge 70 and the groove 81, the diameter of said sleeve at this point being such as to separate the ends of the bell-levers 69 a sufficient distance to effect engagement of the brake-ring 63 with its seat in the gear 20 in the manner heretofore described.

Heretofore the common practice in making screws has been to support the screw-blank in a revoluble spindle by its head allowing the end on which the thread is to be cut to project and to secure the tools against rotation in a revoluble head, as the turret of an ordinary screw-machine, mounted opposite to the end of the spindle carrying the screw-blank and to subject said screw-blank to the operation of the tools in succession by rotating said head and feeding the same toward and from said screw-blank, the final operation where the screws are formed from a continuous bar of stock consisting in cutting off the finished screw from the bar of stock. Our improved method of making screws may be briefly and broadly described as follows: The tools are supported on revoluble spindles mounted in a circle, so that the angular distance between adjacent spindles will be the same or multiples of the same angle, which may for convenience be called the "angular unit," and a plurality of separate screw-blanks, each of proper length to make a finished screw, are secured by their heads and with their ends projecting toward the tools in chucks or jaws on a revoluble head mounted opposite to the tools, so that its axis of rotation will coincide with the center of the circle defined by the tool-spindles, the angular distance between adjacent chucks or jaws being equal to or an equal part of the angular unit between adjacent tools. Intermittent rotary movement through angles equal to the angular distance between adjacent chucks or jaws is imparted to the head on which said chucks or jaws are carried, and during its periods of rest said head is fed toward and retracted from the tools, the relation and adjustment of parts being such that during periods of rest between successive rotary actuations of said head screw-blanks secured in the chucks or jaws thereon will register with the tools. Thus as said head is fed toward the tools a plurality of screw-blanks will be subjected to the operation of said tools simultaneously, and as said head is rotated each screw-blank will be presented to the different tools in succession. The tools all operating simultaneously on different screw-blanks it is apparent that the equivalent of a finished screw will be formed every time said head is fed toward and from the forming-tools, and also that at every complete revolution of said head as many finished screws will be formed as there are chucks or jaws on said head or as three hundred and sixty degrees is a multiple of the intermittent angular actuation of said head.

The machine illustrated in the drawings is designed and adapted for making set-screws, and the tools comprise a body-mill, a pointing and cupping tool, and a threading-die. In connection with said tools a counting device and a combined broach and discharge tube are shown. The machine illustrated is of the type also adapted to form its own screw-blanks from a continuous bar of stock fed to the screw-blank-supporting chucks or jaws through a suitable stock-spindle.

All of the foregoing tools and devices are arranged in a circle in the manner hereinbefore described, the angular unit being sixty degrees, and their construction and operation will now be described in detail.

The stock-spindle and the spindles which carry the body-mill J, the pointing and cupping tool K, and the threading-die L, respectively, are all revolubly mounted in suitable bearings in transverse webs or bridges M N, preferably formed integral with the bed A of the machine. (See particularly Figs. 1, 2, 5, 5ª, 6, and 6ª.)

The stock-spindle F, the body-mill spindle Q, and the pointing and cupping tool spindle H are all secured in their respective bearings by means of nuts 83, threaded thereto, hardened-steel washers 84 being preferably inserted between said nuts and the ends of the bearing-boxes of said spindles. In the preferable construction shown also said nuts 83 are threaded directly to the bodies of said spindles, said nuts being split to provide for engaging them with the threads on said spindles and the sections thereof being secured together by clamping-screws 85. Said screws 85 also provide convenient means for clamping said nuts in any desired longitudinal adjustment upon said spindles. Thus when the washers 84 have been forced into desired frictional engagement with the ends of the bearing-boxes by means of said nuts 83 said nuts may be clamped securely to said spindles to lock said spindles in fixed longitudinal adjustment.

The stock-spindle F (see particularly Figs. 5 and 5ª) is hollow, and the bar of stock, partially shown at 86, is delivered to the machine therethrough by means of a "wire-feed," which as regards its general features is of the familiar type comprising a feed-tube 87 and spring-jaws 88 on the front end of said feed-tube adapted to grip the bar of stock with sufficient force to impart movement thereto with said feed-tube when said bar of stock is free to move therewith. The stock-spindle F is also provided with a stock-chuck adapted to secure the bar of stock therein against movement. As shown, said chuck is of the type comprising a chuck-body 89, secured to the end of the spindle, a split chuck-collet 90, preferably secured against rotation relatively to the chuck-body 89 by a key 91, a plunger 92, a butt-ring 93, secured to the rear end of said plunger, bell-levers 94, pivoted in a collar 95 on the stock-spindle, the short arms of which bear against the rear end of the butt-ring 93, a wedge 96, which is longitudinally movable on the stock-spindle and is adapted to force the long arms of the bell-levers 94 outwardly, and thereby force the plunger 92 forward, which will in turn force the chuck-collet 90 into the taper of the chuck-ring 89 and clamp said collet upon the bar of stock.

In order that the head of a blank on the bar of stock may be grasped by the blank-supporting chucks, as hereinafter described, it is necessary that the end of the bar of stock or of the blank thereon be fed to a fixed point, whether the machine be set for making long or short screws, and that the cut-off and necking tools be set relatively to said blank-supporting chucks or the point to which the end of the blank is fed. If a single stock-chuck were used adapted for making the longest screws the machine is designed to make, it is obvious that when set for making the shortest screws the cut-off and necking tools would be operating on the bar of stock at a considerable distance from said chuck and that the bar of stock would not be held as stiff and rigid as though set closer to the stock-chuck, thereby increasing the liability of said bar of stock catching on the said tools, which would tend to break said tools or cause them to chatter. Thus in making one (1) inch screws with a stock-chuck adapted for making two (2) inch screws the cut-off and necking tools would be operating at a distance of considerably more than one (1) inch from said chuck, which would render the bar of stock very unsteady and which is impracticable. To remedy this objectionable feature, provision is made for changing the chuck-bodies in order that a longer or a shorter chuck may be used, as it is desired to set the machine for making shorter or longer screws, a chuck of such length being used that it will grasp and support the bar of stock in desired proximity to the cut-off and necking tools. With chuck-bodies threaded to the end of the stock-spindle in the usual manner great difficulty would be experienced in effecting register of the opening in said chuck with the blank-supporting chucks. To facilitate changing the chuck-bodies and to insure register of the opening therein with the blank-supporting chucks, said chuck-body 89 instead of being threaded to the end of the stock-spindle is bolted to a ring 97, threaded to the end of said spindle in fixed adjustment. Forming said ring 97 separate from the stock-spindle F is a construction of economy and convenience in manufacture only; otherwise a collar formed intergal with said spindle could be used equally well. With this construction it is obvious that it will require very little time and will involve very little trouble to change the chuck-bodies and that by disposing the keys 91 and the attaching-bolts 98 in all of said chuck-bodies in the same positions relatively to the hole through the chuck-collet 90 the opening in said chuck-collet will always register with the blank-supporting chucks in the necessary manner.

Obviously when the length of the chuck-body 89 is varied the length of the chuck-collet 90 will have to be varied correspondingly. In practice we have usually done this by inserting a ring of desired length between the rear end of said chuck-collet 90 and the front end of the plunger 92. (See Fig. 5ª.)

Movement longitudinally of the spindle F to lock and release the bell-levers 94 at desired predetermined intervals is imparted to the wedge 96 by means of a lever 99 in the following manner, (see Figs. 5 and 9:) The lever 99 is pivoted upon an extension of the bearing-box of the shaft D, formed in the plate 11. Formed on the upper end of said lever is a yoke 100, secured in which are pins 101, the inner ends of which engage a groove 102, formed in the surface of said wedge 96. Secured to the lower end of said lever 99 is a lateral projection 103, which engages a cam formed on the drum 47, adapted to impart movement to said lever 99, and thus to the wedge 96 in opposite directions in the desired manner. As shown, the projection 103 comprises an antifriction-roller revolubly mounted upon a stud rigidly secured in said lever 99.

The wedge 96 is adapted to be manually operated, when desired, in the following manner, (see Fig. 1:) Formed on the lower end of the lever 99 is a tooth or lug 104, which projects into the path of travel of shoulders 105 on a block 106, secured to a shaft 107, revolubly mounted in suitable bearings in the machine-frame. Rotation may be imparted to the shaft 107 to move the lever 99 pivotally to operate the wedge 96 by means of a hand-lever 108, secured thereto.

Instead of being rigidly secured to the spindle F the collar 95 is supported in yielding adjustment thereon in the following manner, (see Fig. 5:) Threaded to said spindle F in the rear of said collar 95 is a ring 109, in which are mounted spring-plungers 110, the forward ends of which project beyond the face of said ring and abut against the rear face of the collar 95. As shown, said plungers 110 are fitted to and are longitudinally movable in holes or sockets 11, formed in said ring 109, and coiled springs 112 are inserted between the heads of said plungers and the rear ends of said holes or sockets surrounding the shanks of said plungers as guides. As shown also the rear ends of the shanks of said plungers 110 project through holes or openings in the rear side of said ring 109, and secured thereto are washers 113, which limit the movement of said plungers under the influence of the springs 112. The springs 112 are sufficiently strong to insure the desired operation of the bell-levers 94 and adjunctive parts under normal conditions. If, however, excessive resistance is offered to the movement of the parts actuated by the bell-levers 94, as should the bar of stock run uneven, being larger in some parts than in others, or should chips become lodged between the engaging surfaces of the chuck-body 89 and of the chuck-collet 90, either of which might prevent the designed operation of the machine or might even subject parts thereof to a strain which would break them, said springs 112 will be compressed, allowing the machine to go through its regular cycle without undue strain on any of its parts and without blocking the machine.

The relation and adjustment of parts is such that the chuck-collet 90 will be closed when the feed-tube 87 is retracted and will be open when said feed-tube is advanced. The bar of stock will thus be held against rearward movement with said feed-tube and will be fed forward by and with said feed-tube.

In the preferable construction shown also spring-jams 114, substantially like and adapted to grip the bar of stock in the same manner as the jaws 88 on the forward end of the feed-tube 87, are secured in the rear end of the said feed-tube. These jaws are for the purpose of feeding the bar of stock before it reaches said jaws 88, thus providing for starting a bar of stock into the machine as soon as the rear end of the bar on which the machine is operating passes said jaws 114. Located in the rear of the feed-tube is a retaining device which operates in connection with the jaws 114 and prevents the bar of stock from being retracted by said jaws before it reaches the collet 90. In the preferable construction shown (see particularly Figs. 35 and 36) said retaining device consists of a sleeve 115, revolubly secured against longitudinal movement in a bushing 116, secured in an arm 117 on a rearward extension 118 on the machine-frame, said arm 117 being preferably formed on a plate or saddle 119, removably secured to said rearward extension 118 on the machine-frame. As shown also the arm 117 is split at the outer side of the opening formed therein to receive the bushing 116 and is adapted to be clamped upon said bushing to secure it therein by means of a clamping-screw 120. Formed through the sleeve 115 is a hole 121, adapted to allow the bar of stock to pass through it freely. Hinged or pivoted at one end to the rear face of the sleeve 115 and at one side of the hole or opening 121 therein, so that it will extend across said hole and its free end will be movable toward and from the face of said sleeve 115, is a plate 122. A spring 123, inserted between said plate and the face of the sleeve 115, operates to force the free end of the plate 122 away from the face of the sleeve 115, suitable means operating to limit the movement of the free end of said plate 122 under the influence of said spring. As shown, said plate 122 is pivoted upon a stud or bolt 124, the head of which forms a stop limiting the movement of the plate 122 under the influence of the spring 123 in the desired manner. A hardened-steel die 125 is preferably secured to the rear side of the plate 122. Formed in the plate 122 and the die 125 is an opening 126, which registers with the hole 121 in the sleeve 115, the section of said opening formed in said die 125 being of the same shape and slightly larger than the bar of stock on which the machine is operating and the section of said hole formed in the plate 122 being somewhat larger than the section in the die 125. With this construction it is obvious that as the feed-tube is retracted the edges of the hole in the die 125 will bight upon the bar of stock 86 and will secure the same against rearward movement with said feed-tube.

In the preferable construction shown also means are provided for securing the plate 122 in contact with the face of the sleeve 115 to prevent the die 125 from gripping the bar of stock when desired. As shown, said means consists of a catch or button 127, pivoted to the sleeve 115, and adapted to be turned so as to lock over the free end of said plate 122. As shown also means are provided for automatically releasing said catch when the machine is started, said means consisting of a pin 128, which projects into the path of travel of an end of the catch 127, so that said catch will be turned by contact therewith a sufficient distance to release said plate. As shown, the pin 128 is adapted to be thrown into or out of the path of travel of the catch 127 by means of an eccentric 129, revolubly mounted in a suitable bearing on the slide or saddle 119 and adapted to be manually operated by means of a handle 130. The eccentric 129 is secured in its bearing and the rotary movement thereof limited by means of a stud 131, which engages a suitable peripheral groove in said eccentric.

The rearward extension 118 on the machine-frame preferably consists of a bracket removably secured thereto. As shown, Fig. 6, said bracket is secured in position upon the bed of the machine-frame in the following manner: Formed on the forward end of said bracket is a circular projection 132, at the base of which is a shoulder 133. The projection 132 is fitted to an opening 134, formed in the bridge M on the frame, and said projection is firmly secured in said hole or opening 134 by means of a bolt 135, threaded into the end of said bracket, the head of which bears against a plate 136, which extends across the opening 134 on the front side of the bridge M. Between its ends said bracket 118 rests upon the bed A and is rigidly secured thereto by means of a bolt 137.

The plunger 92 is connected to the stock-spindle F, so as to rotate therewith, by means of the bell-levers 94, (see Fig. 5,) the short arms of which extend through slots 138 in said stock-spindle and engage slots 139, formed in the rear end of the butt-ring 93. The feed-tube 87 is connected to the stock-spindle F, so as to rotate therewith, by means of keys 140, secured to said stock-spindle, which engage grooves 141, formed longitudinally in the feed-tube.

The feed-tube 87 may be reciprocated to feed the bar of stock by any suitable means. As shown, (see Figs. 5, 6, and 7,) said tube is revolubly secured against longitudinal movement in an arm 142 on a slide or saddle 143, fitted to and longitudinally movable on suitable guides or ways formed on the bracket 118. As shown, the bearing for said feed-tube in said arm 142 is formed in a bushing 144, secured in said arm 142 in the same manner as the bushing 116 is secured in the arm 117, the arm 142 being split at the outer side of the opening therein to receive said bushing and being adapted to be clamped upon said bushing by means of a clamping-screw 145. As shown also said feed-tube is secured in fixed longitudinal adjustment in said bushing by means of nuts 146, threaded to said feed-tube on opposite sides of said bushing. As shown also ball-bearings are provided on both sides of said bushing. As shown, said ball-bearings consist of rings 147, which bear against the sides of said bushing in which are formed V-shaped ball-races 148. The balls 149 are confined in said ball-races 148 by means of disks 150, adapted to be forced against said balls with the desired pressure by means of the nuts 146, which bear against the outer sides thereof. Preferably also thimbles 161 inclose the members of said ball-bearings at their edges, said thimbles being snugly fitted to the rings 147, whereby said thimbles 151 will be secured in position and being loosely fitted to the disks 150 to allow said disks 150 to rotate freely with the feed-tube.

Revolubly mounted in a suitable bearing in the bracket 118 is a stub-shaft 152, to the upper end of which is secured a crank or disk 153, which is connected to the slide or saddle 143 by means of a connecting rod or link 154, one end of which is pivoted to the crank or disk 153, eccentrically to its axis of rotation, and the opposite end of which is pivoted to the slide or saddle 143. With this construction it is obvious that rotation of the crank or disk 153 will impart a reciprocating movement to the slide or saddle 143, and that the eccentricity of the point of attachment of the link 154 to said crank or disk 153 will determine the travel of said slide or saddle, and thus the feeding of stock to the machine.

As preferably constructed, means are provided for changing the feed of the machine by varying the eccentricity of the point of attachment of the connecting rod or link 154 to the crank or disk 153. As shown, this is effected in the following manner: Secured in the connecting rod or link 154 are pins 155 156, of which the pin 155 is interchangeable in a series of holes 157, formed in the crank or disk 153 at different distances from its axis of rotation, and the pin 156 is interchangeable in a series of holes 158, formed in the slide or saddle 143, the holes 158 in the slide or saddle being preferably formed in a plate 159, removably secured in said slide or saddle, thus providing for hardening said plate. The pins 155 and 156 are secured in engagement with the holes which they respectively engage by means of a spring-pressed shoe 160, supported in a bar 161, which passes over said connecting rod or link 154. As shown, the bar 161 is hinged to the bracket 118 at one side of said connecting rod or link and is bolted to said bracket 118 at the other side of said connecting rod or link, thus making provision for quickly removing the bar when it is desired to change the feed of the machine. As shown also the shoe 160 is maintained in position in the bar 161 against the pressure of the spring applied thereto by means of a nut 162, threaded to the projecting end of the shank 163 of said shoe. The upper surface of the connecting rod or link 154, upon which the shoe 160 bears, slopes from the middle toward both sides, and formed in the surface of the spring-pressed shoe 160, which bears upon said connecting rod or link, is a shallow V-shaped depression, the angle of which is substantially the same as the angle formed by the inclined surfaces on the back of said connecting rod or link. The V-groove in the shoe 160 is in engagement with the angular surface on the back of said connecting rod or link when said connecting rod or link is in its middle position—that is, when the slide or saddle 143 is at the ends of its travel and forms a lock to secure said slide or saddle and the parts actuated thereby in their end positions.

Intermittent rotary motion through one hundred and eighty degrees is imparted to the stub-shaft 152 and to the disk 153, carried thereon, in the following manner: Formed on or secured to the lower end of said stub-shaft 152 is a bevel-gear 164, which is adapted to be engaged by segmental gears 165 on the shaft C, the relation of parts being such that each of said segmental gears will rotate said bevel-gear 164 through one hundred and eighty degrees, or one-half of a revolution, and will leave the teeth of said bevel-gear 164 in proper position to be engaged by the teeth of the following segmental gear 165. As shown, the bevel-gear 164 contains eight teeth and the segments 165 three teeth each.

The relation of parts is such that in positions of rest—that is, when the segmental gears 165 are out of engagement with the gear 164—the slide or saddle 143 will be at one limit or the other of its movement, or, in other words, such that the hole 157, with which the pin 155 is in engagement, being the crank-pin of the crank or disk 153, will be at its extreme throw on one side or the other of the axis of revolution of said crank or disk. With the described construction, there being eight teeth in the gear 164, this can be effected by locating the holes 157 on radial lines located forty-five (45) degrees from each other. As heretofore explained, however, when it is desired to reset the machine to make a longer or shorter screw than that which it is making at a given time the feed must be varied in such manner that the blank, long or short, will be fed to the same point through the stock-spindle; but when the pin 155 is changed from one hole 157 to another the travel of the slide or saddle 143 will be varied symmetrically on both sides of a central point. Thus to bring said slide or saddle to the same forward limit of travel it will be necessary to change the pin 156 from the hole 158, with which it is in engagement at the time, to one farther forward when it is desired to increase the feed, or to one farther back when it is desired to decrease the feed. As shown, there are ten holes 157 in the crank or disk 153 and only five in the slide or saddle 143, the holes in said slide or saddle corresponding to alternate holes in said crank or disk. This is due to the fact that with desired fineness of feed the holes 158 in said slide or saddle would run into each other if a hole 158 were provided for each hole 157. In practice, therefore, we have used two bars 154 of different lengths, one of said bars being longer than the other by an amount equal to one-half the distance between adjacent holes 158. In Fig. 6ᵇ bars 154 for effecting different feeds are shown.

As shown, the segmental gears 165 are formed on plates or arms 166, the inner ends of which are fitted to a circular shoulder formed on the drum 47 and which are secured to said drum by means of bolts 167, which engage a T-slot formed in said drum in substantially the same manner as the projections 46 are secured to said drum. Provision is thus made for adjusting said segmental gears circumferentially of the shaft C to vary the times of actuating the stub-shaft 152 and the parts controlled thereby to cause the same to work in desired relation to other parts operating in combination therewith.

In addition to the feed-tube 87 the stock-spindle F is provided with what may be designated "ejector-fingers" 168, (see Fig. 5ª and Figs. 38 to 43,) which are adapted to discharge pieces of stock from the stock-chuck which are too short to make screws. As shown, said ejector-fingers are fitted to and are longitudinally movable in suitable slots in the feed-jaws 88. The ejector-fingers 168 are preferably resilient and are adapted to spring inwardly toward each other when free to do so, so that the distance between them will be less than the diameter of the bar of stock. Suitable stops on the feed-jaws 88 limit the inward movement of said ejector-fingers and also operate to spring said ejector-finger apart with said feed-jaws as said feed-jaws are expanded by inserting a bar of stock therethrough. As shown, said stops consist of unsevered portions 169 of the feed-jaws 88, which bridge the slots in which said ejector-fingers are confined. In order that the ejector-fingers 168 will extend inwardly a desired distance, the extreme forward ends 170 thereof are turned inwardly toward each other, the lengths of said inwardly-turned ends 170 being such that when the ejector-fingers 168 are in contact with the stops 169 on the feed-jaws 88 they will terminate just outside of the hole or opening through said feed-jaws and will be held out of contact with the bar of stock in said feed-jaws. The forward ends of said ejector-fingers are adapted to play through slots 171 in the chuck-collet 90, so that when in their extreme forward positions they will project beyond the end of said collet. When in their rearward positions, the inwardly-turned ends 170 of said ejector-fingers 168 enter slots 172 in the feed-jaws 88, thus providing for retracting said ejector-fingers rearwardly beyond the forward ends of said feed-jaws. With this construction it is obvious that when the feed-jaws 88 are retracted beyond the end of a piece of stock secured in the stock-chuck both said feed-jaws and the ejector-fingers will spring inwardly behind said piece of stock. It is also obvious that as said feed-jaws and ejector-fingers are again advanced the piece of stock will be forced forward first by the feed-jaws 88 and after they have reached their forward position by the ejector-fingers 168, which will operate to eject said piece of stock from the stock-chuck. With this construction it is obvious that said ejector-fingers will play idly back and forth until the bar of stock in the machine becomes too short to make a screw, when, together with the feed-jaws 88, they spring inwardly behind said piece of stock and supplementing the operation of said feed-jaws will operate to eject said piece of stock from the stock-chuck. The duty imposed on said ejector-fingers will thus be very light and the danger of breaking them very slight.

The rear ends of the ejector-fingers 168 are attached to rods 173, which are fitted to and are longitudinally movable in slots 174 in the plunger 92 and in grooves 175, formed in the inner surface of the butt-ring 93, and grooves 176, formed on the exterior of the feed-tube 87.

The rear ends of the rods 173 are secured to a ring 177, fitted to and longitudinally movable on the feed-tube 87, and movement longitudinally of said feed-tube to impart desired movement to the ejector-fingers is imparted to said ring in the following manner: Pivoted upon the slide or saddle 143 is a lever 178, one end of which engages a groove 179, formed in the ring 177. As the slide or saddle 143, carrying the feed-tube 87, moves forward to feed the bar of stock the opposite end of the lever 178 is adapted to strike a pin 180, secured in a bracket 181 on the rearward extension 118 of the machine-frame. A differential movement relatively to the feed-tube 87 and in the same direction will thus be imparted to the ejector-fingers, and the relation of parts is such that when the feed-jaws 88 on the feed-tube 87 are at the forward limit of their movement said ejector-fingers will project beyond the end of the chuck-collet 90. A suitable stop limits the rearward movement of the ejector-fingers 168 relatively to the feed-jaws 88, so that said ejector-fingers will be retracted only a short distance back of the forward ends of said feed-jaws. As shown, said stop is formed by the bearing of the feed-tube 87 in the arm 142 on the slide or saddle 143, with which the ring 177 is adapted to come into contact when the ejector-fingers 168 have been retracted a desired distance relatively to the feed-jaws 88. A spring 182, one end of which is attached to the lever 178 and the other to a pin 183 or other suitable support on the slide or saddle 143, is adapted to impart pivotal movement to said lever to retract said ejector-fingers relatively to the feed-tube 87. Said spring will also provide for bodily rearward movement of the lever 178 with the slide or saddle 143 after the ring 177 strikes the bearing-box of the feed-tube in the arm 142. In order to vary the movement of the ejector-fingers 168 to provide for adjusting the machine for making longer or shorter screws, the pin 180 is interchangeable in a series of holes 184 in the bracket 181, disposed longitudinally of the machine, there being a hole 184 corresponding to each hole 157 in the crank or disk 153. In the preferable construction shown also an antifriction-roller 185 is mounted on the free end of the lever 178, the edges of said roller being rounded, so that it will fit the groove 179 in the ring 177 in all positions of said lever.

Rotary movement is imparted to the stock-spindle F in the following manner, (see Figs. 5ª and 7): Revolubly mounted in the bridges M and N of the machine-frame is a shaft Q, which is driven directly from the shaft B by means of bevel-gears 186 187, rigidly secured to the shafts B and Q, respectively. Relatively large and small back gears or pinions 188 189 on the shaft Q respectively engage relatively small and large gears 190 191, loosely mounted on the stock-spindle F, which are adapted to be secured to said spindle at desired predetermined intervals, preferably by means of suitable clutches. As shown, the gear 190 is adapted to be secured to said shaft by means of a friction-clutch, (indicated as a whole by R,) which, as shown, is substantially identical in construction and operation with the clutch E, which secures the gear 15 to the shaft D and will be clearly understood without a detailed description thereof. The gear 191 is adapted to be secured to said stock-spindle F by means of clutch-teeth 192 thereon, which are adapted to be engaged by corresponding clutch-teeth 193, formed on a sleeve 194, splined to said stock-spindle. As shown, the sleeve 194 is mounted between the gear 191 and the clutch R, and the wedge which controls said clutch R is formed on said sleeve, the relation and adjustment of parts being such that movement of said sleeve to lock the clutch R will disengage the clutch-teeth 192 193, and vice versa, and such also that during a portion of the travel of said sleeve both clutches will be disengaged from said stock-spindle. Movement longitudinally of the stock-spindle is imparted to the sleeve 194 to secure the gears 190 191 to said stock-spindle and to release said gears therefrom by means of a lever 195, pivoted upon the machine-frame, (see Figs. 14, 15, and 16,) a projection 196 on the upper end of which engages a groove 197, formed in said sleeve 194. Formed on the lower end of the lever 195 is a cam-surface comprising sections 198 199, of which the section 198 is substantially concentric with the pivotal axis of said lever, and the section 199 is upwardly inclined. Pivoted at one end upon the machine-frame is a lever 200, a pin or stud 201 on which is held yieldingly in engagement with the cam-surfaces 198 199 by means of a spring 202, applied to the free end of said lever 200. With this construction it is obvious that when the pin or stud 201 is in engagement with the cam-surface 198 the lever 195 will be unaffected thereby and when in engagement with the cam-surface 199 the tension of the spring 202 will tend to throw the lever to effect engagement of the clutch-teeth 192 193, and thus to secure the slow driving-gear 191 to the stock-spindle. The strength of the spring 202 is such that when the sleeve 194 is free to move under its influence it will throw said sleeve to effect engagement of the clutch-teeth 192 193. The relation of parts is such that when the sleeve 194 is in position to lock the clutch R the pin or stud 201 will be in engagement with the cam-surface 198, and thus inoperative.

The cam-surfaces 198 199 are preferably formed on a hardened-steel plate 203, secured to the end of the lever 195. Preferably also the pin or stud 201 is provided with an antifriction-roller.

Pivotal movement is imparted to the lever 195 to lock and disengage the clutch R at desired predetermined intervals by means of suitable surfaces on a cam 204 on the shaft C, which are adapted to engage a pin or stud 205, secured in the lower end of said lever 195, said pin or projection being preferably provided with an antifriction-roller.

In order that the screw-blank carried on the end of the bar of stock may be stationary when the chuck-jaws, hereinafter to be described, are closed upon the same, means are provided for stopping the stock-spindle at the time said chuck-jaws are closed and in proper position for the chuck-jaws to grasp the same in desired manner. As shown, the means for so stopping said spindle are as follows, (see Figs. 15, 16, and 17): Formed in the sleeve 194 are stop-slots 206, which are adapted to be engaged by a pin or projection 207, which projects inwardly from a lever 208, pivoted upon the machine-frame, the opposite end of which projects into the path of travel of a cam 209 on the shaft C, a spring 210, applied to said lever, being adapted to move the lever 208 pivotally to effect engagement of the pin 207 with the stop-slots 206. As shown, the lever 208 has a hardened-steel shoe 211 secured to its free end, which is provided with a tongue or projection 212, which engages the cam-surface on the cam 209.

During all of the time that the clutch R is locked and during most of the time that the clutch-teeth 192 193 are in engagement the tongue or projection 212 on the lever 208 rides on a substantially cylindrical section of the cam 209, in which position the pin 207 will be held out of engagement with the slots 206, and the stock-spindle F will be free to rotate. When it is desired to stop said stock spindle, however, the tongue or projection 212 drops into a recess or notch 213 in said cam 209, thus allowing the spring 210 to move the lever 208 pivotally to effect engagement of the pin 207 with one of the slots 206, the position of said recess or notch 213 and its dimension circumferentially of the cam 209 being such that the stock-spindle will be held stationary during the time that the blank-supporting chucks are being closed. Secured to the sides of the notch or recess 213 are hardened-steel plates 214 215, which receive the wear due to the action of the tongue or projection 212. The relation of parts is such also that the stock-spindle F will be stopped almost immediately after the sleeve 194 has been moved to disengage the clutch R and to effect engagement of the clutch-teeth 192 193, which form an effective brake adapted to check the speed of said stock-spindle, as each time the teeth 193 on the sleeve 194 "run over" the teeth 192 on the gear 191 it will necessitate stretching the spring 202 through the medium of the projection 201 on the lever 200 acting on the cam 199. Before stopping said stock-spindle F it will thus be necessary to disengage the clutch-teeth 192 193. In the preferable construction shown this is effected by forming the slots 206 on an incline toward said teeth and disposing the pin or stud 207, so that it will engage said slots adjacent to their forward ends, the relation being such that said pin or stud 207, acting on the inclined front side of the slot 206, which it engages, will move the sleeve 194 longitudinally of the stock-spindle to disengage the clutch-teeth 192 193 before said pin or stud reaches the end of said slot 206. A great advantage of throwing the clutch-teeth 192 193 into engagement when the clutch R is disengaged and before stopping the stock-spindle is that said stock-spindle will be positively rotated at a slower speed until it reaches the position in which it is designed to be stopped by the pin or stud 207—that is, with the opening in the chuck-collet 90 in register with the blank-supporting jaws without relying on the momentum of said stock-spindle, which might not always operate as intended. The relation and adjustment of parts are such also that during the time the stock-spindle is held stationary by the pin or stud 207, the stud or projection 201 on the lever 200 will bear on the inclined cam-surface 199 on the lever 195. Thus as soon as the pin or stud 207 is disengaged from said slot 206 the spring 202 will at once throw the clutch-teeth 192 193 into engagement and rotate the stock-spindle positively at its slow speed and with great power, thereby twisting a blank which has been previously partially severed from the bar of stock off from said bar of stock.

In order to eliminate as much as possible the noise caused by the clutch-teeth 192 193 running over each other, we prefer to provide means independent of said clutch-teeth for braking or checking the speed of the stock-spindle when the clutch R is disengaged. In the preferable construction shown said means consist of an arm 216 on the lever 208, which extends up on the rear side of the stock-spindle F. Secured in said arm is a plug 217 of hard wood or other suitable material. Just before the clutch R is disengaged pivotal movement is imparted to the lever 208 to advance said plug 217 into engagement with the surface of the sleeve 194 with sufficient pressure to "brake" or check the stock-spindle. As shown, this is accomplished by providing a projection 218 on the surface of the cam 209, which will engage the projection 212 on the lever 208 just before said projection 212 drops into the notch or recess 213, the height of said projection 218 being such that the lever 208 will be moved pivotally thereby sufficiently to depress the plug 217 into frictional engagement with the surface of said sleeve 194 in the desired manner. A convenient manner, as shown, for forming the projection 218 consists in extending the plate 215, secured to a side of the notch or recess 213, above the cylindrical section of the cam 209. In the preferable construction shown also the plug 217 is adapted to be adjusted outwardly by means of a screw 219, threaded into the lever-arm 216, which bears against the end of said plug.

The body-mill spindle is preferably driven at a constant rate of speed directly from the shaft B, Figs. 2 and 7. As shown, the body-mill J is carried on the spindle Q, to which the back gears 188 189, which drive the stock-spindle F, are secured. As shown also, said body-mill J is provided with a shank 220, which is fitted to a hole 221 in the end of said spindle Q and is secured therein by means of a screw 222, threaded through a collar 223, secured to the end of said spindle, all in a familiar manner.

The pointing and cupping tool spindle H, Figs. 2 and 7, is revolubly mounted in the webs or bridges M and N of the machine-frame, and rotary movement is imparted thereto by means of the gear 188 on the body-mill spindle Q, which engages a gear 224 on the spindle H.

The pointing and cupping tool K may be of any usual or approved construction. As shown, said tool is of the familiar type comprising a cutter 225, secured in the hollow shank 226 of the cutter-holder by means of a set-screw 227 and a guide-bushing 228 for supporting the screw-blanks.

The pointing and cupping tool K is adjusted so as to form a cup or recess of desired depth—say one-sixteenth ($\frac{1}{16}$) of an inch—in the end of the screw or screw-blank as said screw or screw-blank is fed toward it. In order to relieve the duty imposed upon the cutter 225 as much as possible, and the consequent strain to which said tool is subjected, said pointing and cupping tool K is adjusted so that the screw or screw-blanks will engage the same at a considerable distance from the rearward limit of its movement, and means are provided for imparting a rearward movement to said pointing and cupping tool at a slower speed than the screw or screw-blank is advanced toward said tool, the differential being the desired depth of the cup or recess in the end of the screw. In the preferable construction shown said pointing and cupping tool K is supported and a desired differential rearward movement relatively to the screw-blank is imparted thereto in the following manner: The spindle H is hollow, and fitted to and longitudinally movable in suitable bearings formed on the interior thereof is an auxiliary spindle 229, in which the pointing and cupping tool K is directly secured, the set-screw 227 being threaded through said auxiliary spindle 229 and extending through a slot 230, formed in the shank 226 of the tool-holder, thus providing for adjusting the position of said pointing and cupping tool for making screws of different lengths. Rotation is imparted to the auxiliary spindle 229 from the shaft H by means of a pin 231, secured in said shaft 229, which engages a slot 232, formed longitudinally in the spindle H, which permits of desired longitudinal movement of said shaft or spindle 229. A spring 233, inserted between the rear end of said shaft or spindle 229, and a plug 234, threaded into the rear end of the spindle H, maintains said auxiliary spindle 229 normally at the forward limit of its movement relatively to the spindle H. Pivoted at one end to a stud 235 on the machine-frame is a lever 236, secured in the outer end of which is a stud 237, which projects downwardly into the path of travel of a rod or plunger 238, which, as shown, is secured in the end of the shaft which carries the head on which the screw-blanks are supported during the operation of the machine. Said plunger 238 will thus advance at the same rate as the screw-blanks. Fitted to and longitudinally movable on the exterior of the spindle H is a box 239, which is pivotally connected to the lever 236 at a desired distance from its free end by means of a stud or pin 240, a desirable relation being such that said stud or pin 240 will engage said lever between the stud 237 and its point of attachment to the stud 235 and at a distance from said stud 237 approximately equal to one-tenth ($\frac{1}{10}$) of the distance between said studs 235 and 237. The relation is such also that the plunger 238 will strike the stud 237 on the lever 236 when at a distance of from three-quarters of an inch to one inch from the limit of its movement toward said stud. Formed in the box 239 is a recess or opening 241, the sides of which embrace a ring 242, secured to the auxiliary spindle 229. As shown, the ring 242 is secured to the auxiliary spindle 229 by means of the pin 231, secured in said spindle, and which connects said auxiliary spindle to the spindle H. As shown also, an antifriction-bearing is provided in said box on the front side of said ring 242, which will receive the thrust due to forcing said box 239 rearwardly. With this construction it is obvious that the plunger 238 will impart rearward movement to the box 239 and to the auxiliary spindle 229, which carries the pointing and cupping tool K, but that the travel of said box and of said auxiliary spindle will be less than the travel of said plunger by an amount which may be controlled, as desired, by properly varying the distance between the studs 237 and 240 relatively to the operative length of the lever 236. The adjustment of parts is such also that the plunger 238 will strike the stud 237 just before the end of the screw-blank reaches the pointing and cupping cutter 225. Said cutter will thus be receding as the screw-blank comes in contact therewith. The difference in travel between the plunger 238 and the box 239 is the same as the difference between the movement of the screw-blank and of the pointing and cupping tool, respectively, and is the feed of the pointing and cupping tool. With the described relation the feed of the pointing and cupping tool is one-tenth ($\frac{1}{10}$) of what it would be were said pointing and cupping tool stationary longitudinally, or, more properly, the feeding of the pointing and cupping tool a given distance relatively to the screw-blank occupies ten times as long as though said pointing and cupping tool were stationary, so that the duty on said pointing and cupping tool is only one-tenth ($\frac{1}{10}$) what it would be were said tool stationary. The spring 233 is at all times under tension and is of such strength that it will be unaffected by the operation of the pointing and cupping tool, but will be slightly compressed by the action of the plunger 238. It is thus obvious that as soon as the plunger 238 is retracted the spring 233 will return said auxiliary spindle 229 to its normal position relatively to the spindle H.

To provide for desired pivotal movement of the lever 236, a slot 243 is formed therein, through which the stud 235 extends. This is rendered necessary on account of securing the stud 240 in fixed longitudinal adjustment in the lever 236 and box 239.

As shown, Fig. 9, positive rotary movement at a constant rate of speed is imparted to the threading-die spindle I by a worm 244, secured to the shaft B, which engages a worm-gear 245 on said spindle I. The spindle I may be secured against longitudinal movement in any desired manner. As shown, Fig. 5, said spindle is secured in longitudinal adjustment in the following manner: Threaded to the box forming the rear bearing for said shaft is a thimble 246, an inwardly-projecting shoulder on which engages the rear face of a collar secured to said shaft in fixed longitudinal adjustment. As shown, said collar consists of the outer disk 247 of a ball-bearing, said ball-bearing being secured in fixed longitudinal adjustment between a shoulder 248 on said shaft and the worm-gear 245 thereon, which is held against rearward movement by means of a nut 249, threaded to said shaft in the rear of said worm-gear. It is also obvious that said ball-bearing will operate to take the thrust of said spindle in both directions.

The spindle I is preferably hollow, thus providing for supplying oil to the threading-die therethrough. A pump (not shown) for supplying oil to the tools is driven by means of a sprocket-wheel 250, secured to the rear end of said spindle I.

The threading-die L may be of any suitable or approved construction. In the preferable construction shown, Figs. 28, 29, 30, and 31, said die is of the type known as an "opening-die" and is constructed in the following manner: Fitted to suitable rigid guides on the body of the die, so as to be movable toward and from each other on substantially radial lines relatively to the center of said die-body, are a plurality of chasers 251. In the preferable construction shown said chasers 251 are fitted to suitable slots 252, formed in the die-body, and are provided with grooves 253, which are engaged by tongues 254 on said die-body. For convenience of construction the tongues 254 are preferably formed on blocks 255, removably secured in suitable openings in said die-body. As shown, said blocks 255 are secured in said openings by means of clamping-screws 256, threaded into said die-body, the heads of which project over and engage suitable shoulders on said blocks 255. Suitable stops limit the inward movement of the chasers 251. As shown, said stops consist of shoulders 257 on the die-body adapted to be engaged by corresponding shoulders 258 on said chasers. As shown also, the shoulders 257 are formed on a ring 259, fitted to an opening in the die-body. The chasers 251 are adapted to be locked in operative position by means of wedges 260, the outer sides of which bear against inclined surfaces 261 on the die-body and the inner sides against the ends of said chasers. In the preferable construction shown said wedges 260 are adapted to engage the ends of said chasers directly in line with the cutting-teeth of said chasers—in the present case at the front edges thereof. In the preferable construction shown the wedges 260 are formed on the ends of arms 262, the rear ends of which are secured to a sleeve 263, being preferably pivoted thereto, so that they may be swung outwardly. Movement of the sleeve 263 away from the die-body will obviously operate to withdraw the wedges 260 and release the chasers 251, so that they may be retracted to open the die to allow a threaded screw to be withdrawn therefrom. Preferably, also, means are provided for retracting said chasers to open said die. As shown, said means consist of inclined surfaces 264, preferably formed on the arms 262, which overlap and are adapted to engage corresponding inclined surfaces 265 on said chasers as said arms 262 are retracted, the relation of parts being such that the surfaces 264 will engage the surfaces 265 as soon as the wedges 260 are withdrawn a sufficient distance to permit desired retraction of said chasers.

In the preferable construction shown the die-body consists of two separate parts 266 and 267, threaded or otherwise rigidly secured together, the inclined surface 261, against which the wedges 260 bear, being formed on the outer section 267. Turning the outer section 267 of the chuck-body to screw it up or unscrew it will move the inclined surface thereon toward or from the wedges 260, thus affording convenient means for adjusting the die-opening. The described construction is likewise a very convenient one.

The parts 266 and 267 of the die-body may be secured in any desired adjustment by means of a set-screw 268.

Both the die-body and the sleeve 263 are fitted to and are freely movable longitudinally of an arbor 269, which is preferably hollow, and the shank of which is adapted to be secured in the die-spindle I. Movement of said die-body and of the sleeve 263 on the arbor 269 is limited by means of a suitable stop on said arbor—in the present instance a collar 270 on said arbor between said die-body and sleeve.

The die-body is secured to the arbor 269, so as to rotate therewith. As shown, pins 271 are secured in said die-body which are fitted to and longitudinally movable in suitable holes formed in the collar 270, the rear ends of which are connected to the sleeve 263. Preferably, also, springs applied to the wedges 260 are adapted to maintain said wedges normally locked, so as to maintain the chasers 251 normally in operative position. As shown, this is effected by means of coiled springs 272, inserted between the inner ends of recesses 273 in the sleeve 263 and nuts 274, threaded to the ends of rods 275, which extend through holes in said sleeve and are threaded into or otherwise secured to the pins 271 in the die-body. Said rods 275 will thus form the desired connection between said sleeve and die-body, while at the same time the springs 272 will provide for movement of the sleeve 263 relatively to the die-body to open the die. With the described construction it is obvious that said die will be free to "float" to allow it to accommodate itself to differences between the feed and the pitch of the die.

As shown, Figs. 6ª, 10, 32, 33, and 34, the die L is controlled by means of a lever 276, pivoted upon the machine-frame, a pin 277, secured in the upper end of which engages a groove 278, formed in the sleeve 263. Pivotal movement is imparted to the lever 276 to open said die at desired predetermined intervals by means of a cam 279 on the shaft C, which is adapted to strike a lug or projection 280 on the lower end of said lever 276. In the preferable construction shown oppositely-inclined surfaces 281 282 are formed on the cam 279 and on the projection 280 in such position that they will overlap a sufficient distance to impart necessary pivotal movement to the lever 276 to open the threading-die. From the beveled surface 281 the projection 280 runs upon the side of the cam, which is of such length circumferentially that the threading-die will be held open while the screw is withdrawn therefrom. The projection then runs off from said cam, and the springs in said die again close the chasers thereof and return said lever to its normal position. In order to provide for regulating the time of opening the die L, means are provided for raising and lowering the projection 280 on the lever 276, so that the beveled surface 281 on the cam 279 will strike the same at a desired point in the rotation of the shaft C. To effect this, said projection 280 consists of a separate piece or bar which extends through a hole or opening 283 in a sleeve 284, fitted to a suitable bearing on the lower end of the lever 276 and adapted to be clamped upon said lever in desired vertical adjustment by means of a screw 285, threaded through said sleeve. To facilitate adjusting the piece 280 upon the lever 276 in proper position relatively to the beveled surface 281 on the cam 279, the engaging surfaces on said piece 280 and on the lever 276 are flat, so that when said piece or bar 280 is clamped upon the lever 276 it will always project therefrom in the same lateral position relatively to the cam 279. A hand-screw 286, which extends through the end of the sleeve 249 and is threaded into the end of the lever 276, is provided with a shoulder which bears against the under side of the sleeve 284, affording convenient means for adjusting said sleeve, and thus the piece or bar 280, vertically. The clamping-screw 285 will operate in an obvious manner to secure the piece or bar 280 and the sleeve 284 in fixed longitudinal adjustment upon the lever 276.

The counting device or register (indicated at S) may be of any usual or approved construction. As shown, (see Figs. 1, 6, and 6ª,) said counting device or register S is operated by means of a crank 287, to which oscillatory movement is imparted in the following manner: Secured against rotary movement in suitable bearings in the webs or bridges M N of the machine-frame is a rod 288, fitted to slide on which is a sleeve 289, an arm 290 on which is connected with the crank 287 of the counting device or register by a rod 291. A pin 292, secured in the rod 288, engages a cam-slot 293, the shape of said cam-slot being such that longitudinal movement of said rod 288 through said sleeve 289 will impart oscillating rotary movement to said sleeve and by means of the arm 290 and the connecting-rod 291 the desired oscillatory movement to the crank 287. The rear end of the sleeve 289 rests against a rigid support—in the present case the web or bridge M—and inserted between the front side of said sleeve and a pin 294, secured in the rod 288, is a spring 295. Said spring will thus operate to maintain said sleeve in contact with the web or bridge M, and thus stationary, and will also operate to maintain said rod 288 normally at the forward limit of its movement. The rod 288 is adapted to be forced rearwardly to operate the counter S by a screw-blank supported in operative position in the machine when in alinement therewith. The length of the slot 293 is such as to allow movement of the rod 288 relatively to the sleeve 289 in counting the longest screw the machine is designed to make, and the inclined or cam section thereof is at the front end thereof and is inclined at such an angle that movement of the pin 292 therein when the rod 288 is moved by the shortest screw the machine is designed to make will rotate said sleeve 289 sufficiently to operate the counting device or register.

To provide for separating the screws from the chips formed in making the same, the finished screws are discharged through a tube T, Figs. 1, 8, 21, and 22, the rear end of which extends beyond the end of the machine by suitable means hereinafter to be described.

In order to remove the bur formed by the tools from the heads of the screws, the finished screws are delivered into the discharge-tube T through a broach or die, (indicated as a whole by U, Figs. 21, 22, 23, and 24.) In order that said broach may conveniently adjust itself to slight variations in the sizes of the screw-heads and to prevent the screws from catching therein, said broach or die is preferably expansible. In the preferable construction shown the cutters of said broach or die are carried on separate sections of a spring-collet 296, the front end of which is tapered and is adapted to be compressed by means of a ring 297, secured in the front end of a tubular casing 298, the rear end of which is rigidly secured in the web N of the machine-frame. The rear end of the collet 296 is fitted to a suitable recess formed in the end of a sleeve 299, the body of which is fitted to and is longitudinally movable in a suitable bearing formed in the tubular casing 298, and which is provided with a flange 300, which is fitted to the bore of the casing 298. Inserted between the flange 300 and the rear wall of the casing 298 is a spring 301, which will operate in an obvious manner to force the tapered surface of the collet 296 into the tapered seat in the chuck-ring 297. Threaded to the end of the sleeve 299 is a nut 302, which bears against the rear end of the casing 298. Said nut will thus limit the movement of the sleeve 299 under the influence of the spring 301, and thus control the movement of the collet 296 under the influence of said spring 301, which in turn regulates the size of the hole or opening defined by the broaching-cutters. It is thus obvious that the minimum size of said broach or die may be conveniently adjusted by means of said nut 302.

As shown, the broaching or die cutter consists of two pairs of plates 303 304, secured to the interior of a square opening formed through the spring-jaws of the collet 296, the plates of each set being adapted to dress opposite sides of the screw-head, and said plates together defining a hole or opening of the desired size and shape of the finished screw-head. In the preferable construction shown the plates 303 are secured to the collet 296 in front of the plates 304. As shown also, said plates 303 304 are provided with flanges 305, which engage grooves 306, formed on the interior of said collet, said plates being held in position by means of screws 307, which extend through suitable holes in said collet and are threaded into said plates 303 304. It is obvious that the flanges 305 will receive practically all the strain to which the plates 303 304 are subjected in dressing the screw-heads and will correspondingly lessen the strain on the screws 307.

In case the head of a screw is larger than the broach or die, the collet 296 will be forced rearwardly thereby against the action of the spring 301, thus allowing the jaws of said collet to expand, so as to enlarge the hole defined by the broaching-cutters to allow the screw-head to pass through the same.

As shown, the collet 296 is provided with slots which extend from the front end thereof to within a short distance of its rear end and are disposed so as to register with the corners of the hole or opening defined by the broaching-cutters 303 304.

The collet 296 is secured against rotation relatively to the chuck-ring 297 by means of a key and in such position that the opening defined by the broaching-cutters 303 304 will register with the screw-head presented thereto.

The front end of the discharge-tube T extends into the rear end of the sleeve 299 and to within a short distance of the rear broaching-cutters 304, so that the screws will be discharged from said broaching-cutters into said tube. As shown, Figs. 8 and 22, said discharge-tube is supported in bearings formed on the interior of the sleeve 299 and in a bushing 309, secured in the web or bridge M of the machine-frame. A set-screw 310, threaded through the bushing 309, secures said discharge-tube T in desired longitudinal adjustment.

If desired, the separate cutters 303 304 may be dispensed with and the cutting edges of the broach formed directly on the collet 296. With this construction the collet will preferably be split at the middle of the sides of the square instead of at the corners thereof.

The screw-blanks are necked between the head and the body thereof and are partially severed from the bar of stock while in the stock-spindle F by suitable tools, which are fed toward and from the bar of stock in any desired manner. As shown, the tool which partially severs the screw-blanks from the bar of stock is adapted to rough-point one screw-blank and to face off the end and finish the head of the next succeeding screw-blank. In the preferable construction shown, Figs. 2, 5ª, and 10, the necking-tool 311 and the cut-off tool 312 are secured in a tool-holder 313, so as to be adjustable toward and from the bar of stock. The tool-holder is supported upon the upper end of a lever 314, pivoted between its ends upon a bar 315, secured against rotation to the machine-frame in proper position. The tool-holder 313 is preferably secured to the lever 314 by means of bolts 316, the heads of which engage T-slots 317, formed in said lever, in a familiar manner. Provision is thus made for adjusting the tools longitudinally of a bar of stock supported in the stock-spindle F. The tools 311 312 are maintained normally retracted from the bar of stock by means of a spring 318, applied to the lower end of the lever 314, one end of which is secured to a pin in said lever and the opposite end of which in an eyebolt secured in the machine-frame or other rigid support. Movement of the lever 314 under the influence of the spring 318 is limited by means of a suitable stop. As shown, said stop consists of a screw or bolt 319, threaded through the machine-frame in proper position, thus making provision for adjusting the position of said lever away from the bar of stock. Pivotal movement is imparted to the lever 314 to feed the tools 311 312 into the bar of stock by means of cams 320 321 on the shaft C. To provide for adjusting the movement of the lever 314 under the influence of the cams 320 321, said cams are adapted to engage a block 322, fitted to suitable guides formed in the lower end of said lever 314, so as to be movable toward and from said cams. As shown, said block 322 is adapted to be adjusted by means of a hand-screw 323, secured in said block and threaded into a lug 324 on said lever 314. As shown, screw-threads of different pitch are formed on the hand-screw 323, which respectively engage corresponding screw-threads formed in the block 322 and in the lug 324. As shown also, said block 322 is adapted to be secured in any desired adustment by means of a bolt 325, threaded into the lug 324, the head of which is adapted to clamp said block in fixed position upon the end of the lever 314. In the preferable construction shown the cams 320 321 are secured to the shaft C so as to be adjustable circumferentially thereof, thus providing for varying the times of actuating said lever 314. As shown, said cams 320 321 are secured to a disk 326, keyed or otherwise rigidly secured to the shaft C by clamping-bolts 327, which extend through slots 328, formed in said cams concentric with the axis of the shaft C and are threaded into said disk 326. Preferably, also, circular seats are formed on said cams 320 321, which are fitted to and rest in contact with a circular shoulder 329 on the disk 326.

The operative surfaces of the cams 320 321 being separated by intervening spaces, as shown, it is obvious that the tools 311 312 will be fed toward and retracted from the bar of stock twice during each revolution of the shaft C, the cam 320, being the lower, operating to neck and partially sever the screw-blank from the bar of stock, and the cam 321, being the higher, operating to finish or face off the ends of the screw-heads. During one of the intervals in which the lever 314 is out of engagement with said cams 320 321 the screw-blank is twisted off from the bar of stock at the point of partial severance therefrom in a manner hereinafter to be described, and during the other interval when said lever is out of engagement with said cams the bar of stock is fed forward.

The head (indicated as a whole by V) on which the screw-blanks are supported during the operation of the machine is rigidly secured, preferably by means of a tapered pin 330, to a shaft W, revolubly mounted in suitable bearings in the machine-frame concentrci with the circle defined by the tool-spindles in the manner heretofore indicated. Carried on the head V are chuck-jaws 331, Fig. 11, which are adapted to grip the heads of the screw-blanks delivered thereto through the stock-spindle F. As shown, Figs. 17, 18, 20, and 21, the chuck-jaws 331 are formed on levers 332, pivoted in the head V, six sets of such chuck-jaws being shown located at angles of sixty degrees from each other. In the preferable construction shown the head V is a skeleton frame, consisting of a sleeve 333, fitted to the shaft W and provided with flanges 334 335 at its opposite ends. In the preferable construction shown also, the levers 332 are pivoted in slots 336, formed in chuck-bodies 337, rigidly secured in suitable bearings in the flange 334 of the head V, said chuck-bodies being provided with shanks 338, the ends of which are fitted to and secured in bearings in the flange 335 of said head.

The chuck-jaws 331 are preferably made of tool-steel and hardened. Preferably, also, said chuck-jaws 331 are made separate from the levers 332 and are removably secured thereto by means of bolts 339, said jaws taking under shoulders 340 on said levers and being provided with flanges 341, which embrace the sides of said levers 332.

In the preferable construction shown the bearings for the chuck-bodies 337 are provided with caps 342, removably secured to the head V by screws 343, by means of which said caps 342 may be clamped upon said chuck-bodies, thereby securing them firmly in any desired adjustment in said head.

The chuck-jaws 331 are maintained open by means of springs 344 on the levers 332, which bear against the outer sides of the slots 336 on the opposite sides of the pivot-pins of said levers from the chuck-jaws 331.

The chuck-jaws 331 are adapted to be closed to grip the screw-blanks by wedges 345, fitted to and longitudinally movable on the shanks 338 as guides, which are adapted to separate the ends of the levers 332 opposite to those on which said chuck-jaws are carried, thereby closing said chuck-jaws in the desired manner. Antifriction-rollers 346 are preferably mounted in the ends of the levers 332, which are engaged by said wedges 345 and operate to reduce the friction due to the engagement of said wedges with said levers in an obvious and familiar manner.

To provide for adjusting the chuck-jaws 331 so as to cause them to grip the heads of the screw-blanks with desired strength, the wedges 345 are made elliptical in cross-section, as clearly shown in Fig. 19 of the drawings. With this construction it is obvious that by turning said wedges upon their guides 338 in one direction or the other they will separate the ends of the levers 332, engaged thereby, a greater or less distance, thereby causing the chuck-jaws to approach each other correspondingly more or less closely in the desired manner. As shown, the wedges 345 are provided with circular extensions 347, the ends of which are adjustably secured in suitable bearings in heads 348, which are provided with surfaces 349, fitted to and adapted to slide longitudinally on corresponding guide-surfaces 350, formed on the sleeve 333 of the head V. The engaging surfaces 349 350 are preferably cylindrical, and the surface 349 is preferably formed on an enlargement 351 of said sleeve. As shown also, the heads 348 are split at their outer sides and the extensions 347 of the wedges 345 are adapted to be secured therein by bolts 352, by means of which said heads may be clamped thereupon.

Fitted to and longitudinally movable in holes formed axially in the chuck-bodies 337 and the shanks 338 thereof are plungers 353. Formed on said plungers 353 are collars 354, loosely fitted to recesses 355, formed in the rear ends of the shanks 338. Coiled springs 356, inserted between the collars 354 and the inner ends of the recesses 355, maintain the plungers 353 normally retracted, and bushings 357, threaded into the open ends of said recesses, against which the collars 354 normally bear, limit the movement of said plungers 353 under the influence of the springs 356.

To relieve the pin 330, which secures the head V to the shaft W, from the strain due to the thrust of the tools, said head V abuts against a shoulder 358 on the shaft, Figs. 6ª and 20. As shown also, Fig. 5ª, the plunger 238, which imparts differential movement to the pointing and cupping tool K relatively to the advancing screw-blank, is secured in the end of the shaft W. In the preferable construction shown said plunger 238 is threaded into the end of said shaft W and is adapted to be secured in any desired longitudinal adjustment therein by means of a lock-nut 359, threaded thereto and adapted to abut against the end of the shaft W. A projection 360 on the end of said plunger is fitted to a suitable bearing formed in said shaft W and operates to maintain said plunger 238 in alinement with said shaft.

Reciprocating movement toward and from the tools is imparted to the head V in the following manner, (see Figs. 1, 2, 3, 5ᵇ, and 6ª:) Secured to the rear end of the shaft W is a disk or head X, provided with radial projections 361, preferably provided with antifriction-rollers, which engage a cam 362, formed on a drum 363, rigidly secured to the shaft C. As shown, the disk or head X is keyed to the shaft W and is secured against longitudinal movement relatively thereto between a shoulder 364 on the shaft W and a nut 365, threaded to said shaft outside of said head or disk.

Intermittent rotary movement through angles of sixty degrees is imparted to the shaft W, and thus to the head V, in the following manner, Figs. 3, 5ᵇ, 6ª, 13, and 37: Revolubly mounted on a stud 366, secured in the end of the machine-frame, is a disk 367, secured in which at angles of one hundred and twenty degrees from each other and at equal distances from the center of said disk are pins 368, which are adapted to engage radial slots 369, formed in projections 370 on the head X, the relation of parts being such that rotation of the disk 367 through one hundred and twenty degrees will impart rotary movement to the disk or head X through an angle of sixty degrees. The relation of parts is such also that one of the pins 368 will always be in engagement with one of the radial slots 369 in the disk or head X, a succeeding pin 368 entering a succeeding slot 369 at the same time that a preceding pin 368 is leaving the preceding slot 369 and said pins entering and leaving said slots when the sides of the slots are perpendicular to radial lines drawn from the center of the disk 367 through the pins 368, respectively, entering and leaving said slots, so that said pins will be moving on substantially radial lines relatively to the disk or head X until such time as the pin 368 which is leaving its slot 369 is clear of said slot. The relation and adjustment of parts are such also that between successive rotary actuations of said head X two of the pins 368 will be in engagement with slots 369, one just entering and the other just leaving the slots which they respectively engage, in which position the sides of the slots engaged by said pins will be perpendicular to radial lines drawn from the center of the disk 367 through said pins, as above described and as shown in Fig. 13 of the drawings. Any force tending to rotate the head V, the shaft W, or the head X will thus be transmitted in direct radial lines to the disk 367 with no tangential component tending to rotate said disk. Said pins will thus operate to lock the head X, and thus the shaft W and the head V, against rotary movement except by said disk 367. The locking functions of the pins 368 being due to the relation of such pins to the slots 369 in positions of rest, it is obvious that so long as the perpendicular relation of the sides of the slots to a radial line through a pin in engagement therewith is maintained a single pin will operate to lock the parts controlled thereby against rotation as effectually as the two pins in the preferred construction shown, the primary function of the two pins being to insure absolute registration of said pins with said slots under all conditions.

For purposes of convenient reference the head X will hereinafter be referred to as the "indexing-head" and the disk 367 as the "converter."

Secured to the converter 367 so as to rotate therewith is a gear 371, the teeth of which are adapted to be engaged by a segmental gear 372 on the drum 363, the relation of parts being such that each engagement of the segment 372 with the gear 371 will rotate said gear, and thus the converter 367, through one hundred and twenty degrees. As the last tooth in the segment will always leave the tooth engaged by it in the same angular position relatively to the axis of the gear 371, the desired angular travel of the gear 371 can be secured by using a gear 371 having fifteen teeth and a segment 372 having four teeth and so adjusting said gears that the front tooth of the segment 372 will engage the second tooth in the rear of that which was engaged by the last tooth of said segment at the previous engagement of said segment with said gear. It is thus obvious that the gear 371 will be rotated through an arc occupied by five teeth, which with the proportion described will be one-third of a revolution, or one hundred and twenty degrees, as desired.

As shown, the converter 367 is loose on the stud 366 and is confined between collars 373 374, of which the collar 373 bears against a shoulder on the shaft W and the collar 374 bears against the face of the indexing-head X. Said converter 367 will thus be maintained in fixed operative adjustment relatively to the indexing-head X. As shown also, the segment 372 is adapted to engage the gear 371 to rotate the shaft W and the parts carried thereon when said shaft is at the rearward limit of its movement, thus insuring that the screw-blanks carried in the chuck-jaws 331 will be fully retracted from the tools. During the time that the shaft W is being rotated it is obvious that none of the projections 361 will be in engagement with the cam 362 and that said shaft will be free to shift endwise, which would bring the projection 361 which is about to engage said cam out of register therewith, and thus prevent the designed operation of the machine. During the indexing of said shaft W, therefore, means are provided to prevent it from shifting endwise, consisting of a ring 375, inserted between the end of the head V and the bearing-box 376 of the shaft W, which holds said shaft against movement away from the forming-tools, and the segment 372, which passes just inside of the inner face of the converter 367 and locks said shaft against movement in the direction of the tools.

While the pins 368, engaging the slots 369 in the manner described, during the intervals between successive rotary actuations of the shaft W will operate to lock said shaft against rotation, we prefer in addition thereto to provide an independent positive lock adapted to secure said shaft W and the parts carried thereon against rotation during the intervals between successive rotary actuations of said shaft. As shown, said means consists of the stud 366, which is adapted to engage holes 377, formed in the indexing-head X and which are closely fitted thereto. The length of the stud 366 is such that the holes 377 in the head X will be withdrawn from engagement therewith when the shaft W is at the extreme rearward limit of its movement and during the time said shaft is being indexed, but will reënter the succeeding hole 377 as soon as the shaft W starts forward. As shown also, the holes 377 are formed in bushings 378, secured in suitable holes or bearings in said indexing-head.

As the pins 368 enter and leave the slots 369 when moving on substantially radial lines relative to the indexing-head X, it is obvious that the indexing-head will start to rotate slowly, that its speed will gradually accelerate to the middle of its movement, and then will gradually decrease until said head becomes stationary, thus starting and stopping said head without shock. The principle of this slow starting and stopping movement is described and explained in a prior United States Patent, No. 464,987, dated December 15, 1891, issued jointly to Walter B. Pearson, George D. Phelps, and E. W. Blatchford; but in the construction herein shown we have the pins and slots so arranged that there is always a pin in engagement with a slot, and consequently there is an automatic locking mechanism for the indexing-head, whereby the head is always held against accidental movement between successive intermittent rotations thereof.

In practice we prefer to provide means to insure that the momentum of the converter and of the gear thereon will not cause said converter to overcarry, and thus rotate the shaft W beyond the point of register of the locking-pin 366 with one of the holes 377 in said head—that is, beyond the point of register of the screw-blanks carried in the chuck-jaws 331 with the tools. As shown, Fig. 37, said means consist of blocks 379, fitted to holes or recesses formed in the perimeter of the converter 367 at angles of one hundred and twenty degrees from each other. Said blocks 379 are provided with notches or depressions 380 in their outer surfaces, which are adapted to engage the shaft W when the locking-stud 366 is in register with the holes 377 in the indexing-head X. Inserted between the rear sides of said blocks and the bottoms of the recesses or openings to which they are fitted are springs 381, which allow said blocks 379 to be depressed to effect engagement and disengagement of the notches 380 in said blocks with the shaft W. The exposed surfaces of the blocks 379 preferably slope both ways from the sides of the notches 380, thus forming inclined surfaces, whereby said blocks will be depressed when they strike the shaft W. As shown, the blocks 379 are provided with shanks 382 on their inner sides, which are fitted to and longitudinally movable in suitable bearings formed at the bottom of the holes or recesses to which the blocks 379 are fitted. Said shanks will thus form guides which will prevent the blocks 379 from cocking and wedging in their bearings. As shown also, the blocks 379 are secured in their bearings against the action of the springs 381 by transverse pins 383, secured in the converter 367, which engage elongated openings or slots 384, formed in the shanks 382 of said blocks.

In the preferable construction shown the projections 370 on the indexing-head X, in which the slots 369 are formed, consist of separate pieces of steel fitted to holes in said head and secured therein by means of cap-screws 385, which extend through holes in said head and are threaded into said pieces 370. Dowel-pins 386 secure the pieces 370 against rotation, with the slots 369 extending radially in the desired manner.

Movement is imparted to the wedges 345 to close and open the chuck-jaws 331 at desired predetermined times in the following manner, Figs. 1, 2, 5$^h$, and 12: Pivoted upon the machine-frame is a lever 387, one end of which extends upwardly on the side of the heads 348 remote from said wedges 345 when the chuck-jaws are in register with the stock-spindle F, being the position $a$ indicated in Fig. 11 of the drawings, the chuck-jaws 331 being open to receive the screw-blank from said stock-spindle F when said jaws come into the position $a$. A pin or projection 388 on the lower end of the lever 387 engages a cam 389 on a drum 390, rigidly secured to the shaft C. The relation of parts is such that the upper end of said lever 387 will be out of contact with the head 348 while the head V is being moved toward the tools by the cam 362, the shape of the cam 389 being such, preferably, that the upper end of the lever 387 will strike the head 348 and move the same so as to force the wedge 345, carried thereby, between the ends of the levers 332, thus closing the chuck-jaws 331 just at the time the head V is in its position of nearest approach to the tools. The relation of parts is such also that the lever 208 will be moved pivotally to bring the pin 207, carried thereon, into engagement with a slot 206 in the sleeve 194 on the stock-spindle F to stop said stock-spindle just before the chuck-jaws 331 are closed. The relation of parts is such also that when the stock-spindle F is held stationary by the pin 207 in engagement with a slot 206 the opening in the chuck-collet 90, and thus the screw-blank on the end of a bar of stock secured therein, will register with the chuck-jaws 331 when closed, so that said jaws will grip the head of said screw-blank in the desired manner. When the plungers 353 are at the rearward limit of their movement, the collars 354 thereon bear against the bushing 357, and thus form stops adapted to support the screw-blanks in the chucks against the endwise pressure of the tools. In subsequent positions $a'$, $a^2$, $a^3$, and $a^4$ of the chuck-jaws 331 (see Fig. 11 of the drawings) said chuck-jaws remain closed. When, however, the chuck-jaws 331 are brought into the position $a^5$, (see Fig. 11,) in which they are in register with the discharge-tube T and the broach U, the wedge 345 is withdrawn out of engagement with the levers 332, as the head V is moved toward the tools, by means of a pin 391, secured in a web or bridge 392 on the machine-frame in the path of travel of the head 348. When the chuck-jaws are in the position $a^5$, (see Fig. 11,) the plunger 353 is driven forward by suitable means to force the screw supported in the chuck-jaws 331 through the broach U and into the discharge-tube T, said discharge-plunger 353 being thus driven forward after the wedge 345 is withdrawn from between the levers 332. Between the times that the wedge 345 is withdrawn from between said levers 332 and the finished screw is discharged from the chuck-jaws 331 by the plunger 353 the chuck-jaws 331 are held together so as to support the screw therein in register with the broach U by fingers 393 on the broach U, between which the forward ends of the levers 332 are forced by movement of the head V toward the tools. When held by the fingers 393, the chuck-jaws 331 slightly relax their grip on the head of the screw supported therein, so as to allow the plunger 353 to force the screw from between said chuck-jaws.

As shown, the plungers 353 are driven forward to discharging the finished screws by a member 394, an arm 395 on which extends into the rear of the plunger 353 when in the position $a^5$. An arm 396 on said member 394 is pivoted to the upper end of the lever 387, preferably in line with the point at which the end of said lever strikes the heads 348 to close the chuck-jaws 331 when in the position $a$, and a shank 397 on said head engages a swiveling guide-bearing on the machine-frame. As shown, said shank 397 is fitted to and longitudinally movable in a suitable hole 398, formed transversely through a stub-shaft 399, revolubly mounted in suitable bearings in the rear end of the machine-frame. As shown also, the sides of the shank 397 are flattened and are fitted to a vertical guide-slot 400, formed in the end of said machine-frame, which operates to prevent lateral movement of the shank 397 and to secure the stub-shaft 399 in its bearing. The sides of said shank are flattened in order to provide a wearing-surface of larger area between said shank and guide-slots in the machine-frame. With this construction it is obvious that reciprocating movement will be imparted to the member 394 in a substantially straight line and that the travel of said member will be equal to that of the lever 387 where it engages the heads 348, and the relation of parts is such that the arm 395 on said member 394 will strike the end of the plunger 353 at the same time that the lever 387 strikes the head 348 in position $a$ to close the chuck-jaws 331. The finished screw in position $a^5$ will thus be discharged and the chuck-jaws 331 in the position $a$ will be closed simultaneously. A hole or recess 401 in the member 394 is adapted to receive the rear ends of the plungers 353 when in the position $a$, so that said plungers will not strike said head and be driven forward thereby.

The drum 390, on which the cam 389 is formed, is preferably supported so as to be adjustable circumferentially of the shaft C, thus making provision for regulating the time of discharging the finished screws and closing the chuck-jaws to effect register thereof with other movements of the machine. As shown, an internal flange or rib 402 on said drum 390 is adapted to be clamped between a web or flange on the hub 403, secured to the shaft C and a ring or plate 404 by screws 405, which extend through holes in said ring and are threaded into said flange.

The base $A^2$ is provided with a floor located above the bottom thereof, comprising sections 406 407, the space above said floor being divided by a transverse wall or partition 408. As shown, the section 406 of said floor is substantially level. Formed in the middle longitudinally of the section 407 is a trough 409, toward which the said section 407 of said floor declined on both sides. Adjacent to the partition 408 the bottom of the trough 409 is substantially on a level with the section 406 of said floor and slopes upwardly therefrom toward the end of the machine. Supported in the trough 409 and extending longitudinally thereof is a screw conveyer 410, which is revolubly mounted in suitable bearings formed in the wall 408 and in a bracket 411, secured to the end of the machine-frame. Intermittent rotary movement is imparted to the screw conveyer 410 by means of pins 412 secured therein, which project into the path of travel of a pin or stud 413, secured in the drum 363.

The chips made by the tools will fall upon the section 407 of the floor and being washed down into the trough 409 by the oil supplied to said tools will be carried by the screw conveyer 410 and discharged through an opening 414, formed in the bottom of said trough outside of the base $A^2$, a suitable receptacle (not shown) being preferably provided to receive said chips.

The oil which runs into the trough 373 escapes therefrom through holes or openings 415 in the wall 408 below the discharge-opening 414 and through an opening 416 in the floor-section 406 into a pan 417, supported in suitable position beneath said opening. The pan 417 is preferably provided with transverse partitions 418, which become shorter toward the end of said pan. The spaces 419 between the partitions 418 will thus form settling-compartments, which will operate to remove from the oil fine chips or particles of material which might otherwise be carried along thereby. As often as desired the pan may be withdrawn for the purpose of cleansing the same. Said pan 417 may appropriately be designated as a "sluice-pan."

Beginning immediately after the severing of a blank, at which time the blank-carrying head is fully advanced and the stock-spindle rotating at its slow speed, the sequence of operation is as follows: Immediately after a blank is severed the fast driving-gear is thrown into train with the stock-spindle, causing it to rotate at high speed, the blank-carrying head is retracted and indexed, and at the same time the severing-tool is fed forward to finish the end of the head, and the necking-tool passes over the screw-blank between the head and the body, thus finishing the neck. After the severing and necking tools are retracted and the previously-severed blank is out of the way the bar of stock is fed forward with the stock-spindle still rotating at its high speed. The severing (and necking) tools are then fed forward to partially sever a blank and to rough out the neck and again retracted, immediately after which the fast driving-gear is thrown out of train with the stock-spindle, and the clutch of the slow driving-train thrown in, which, as heretofore explained, will operate to "brake" the stock-spindle and reduce its speed. The lever 208 is then moved pivotally to cause the pin 207 therein to engage one of the cam-slots 206 in the sleeve 194, whereby the clutch-teeth 192 193 will first be disengaged and then the spindle stopped. In the meantime the blank-carrying head has been advanced with a pair of empty chuck-jaws in register with the screw-blank in the stock-spindle and into position to grip the head of the partially-severed screw-blank on the bar of stock. Immediately after the stock-spindle is stopped the chuck-jaws opposite the blank are closed upon the head of the partially-severed screw-blank, after which the pin 207 is withdrawn from the slot 206 to release the stock-spindle and the clutch-teeth 192 193 thrown into engagement, causing the stock-spindle to rotate at its slow speed, which will twist off the partially-severed blank, the head of which is held in the clutch-jaws on the blank-carrying head, thus severing the blank. The sleeve 194 is then moved longitudinally of the stock-spindle to disengage the clutch-teeth 192 193 and to lock the clutch R, causing the stock-spindle to rotate at its fast speed. This completes the cycle, which is repeated indefinitely as long as the machine runs.

The stock-feed mechanism, the mechanism for imparting differential movement to the pointing and cupping tool, the change-speed gearing for driving the cam-shaft, and the mechanism for intermittently rotating and stopping the stock-spindle, all herein shown and described, are not separately claimed herein, but are made the subjects-matter of separate applications filed by us as divisions of the present application, which said applications are respectively identified as follows: application for a mechanism for feeding a bar of stock, filed October 18, 1904, Serial No. 229,031; application for a mechanism for transmitting movement, filed October 18, 1904, Serial No. 229,032; application for a change-speed gearing, filed October 18, 1904, Serial No. 229,033, and application for a mechanism for intermittently rotating and stopping a revoluble member, filed October 18, 1904, Serial No. 229,034.

We claim—

1. The combination with a revoluble and longitudinally-movable member, of an indexing-head thereon provided with slots and holes, a converting-disk, a pin thereon, a driven shaft, operative connection between said driven shaft and converting-disk whereby rotation of said shaft will impart intermittent rotary movement to said converting-disk, projections on the indexing-head, a cam on the driven shaft engaged by said projections and a locking-stud which engages a hole in said indexing-head between rotary actuations thereof on which said converting-disk is mounted, substantially as described.

2. The combination with a revoluble and longitudinally-movable member, of an indexing-head thereon provided with slots and holes, a converting-disk, a pin thereon, a gear secured to rotate with said converting-disk, a driven shaft, a segmental gear thereon which engages the gear on said converting-disk, projections on the indexing-head, a cam on the driven shaft engaged by said projections and a locking-stud which engages a hole in said indexing-head between rotary actuations thereof on which said converting-disk is mounted, substantially as described.

3. The combination with a revoluble and longitudinally-movable member, of an indexing-head thereon provided with slots and holes, a converting-disk, a pin thereon, a gear secured to rotate with said converting-disk, a driven shaft, a segmental gear thereon which engages the gear on said converting-disk, projections on the indexing-head, a cam on the driven shaft engaged by said projections, a locking-stud which engages a hole in the indexing-head between rotary actuations thereof on which the converting-disk is slidably mounted and shoulders on said movably-supported member which embrace the sides of said converting-disk whereby said converting-disk will be maintained in fixed relation to the indexing-head, substantially as described.

4. The combination with a revoluble and longitudinally-movable member, of an indexing-head thereon provided with slots and holes, a converting-disk, a pin thereon, a gear secured to rotate with said converting-disk, a driven shaft, a segmental gear thereon which engages the gear on said converting-disk, projections on said indexing-head, a cam on said driven shaft engaged by said projections, a locking-stud which engages a hole in said indexing-head between rotary actuations thereof on which said converting-disk is mounted and means to prevent overcarrying of said converting-disk, substantially as described.

5. The combination with a revoluble and longitudinally-movable shaft, of an indexing-head thereon provided with slots and holes, a converting-disk, a pin thereon, a gear secured to rotate with said converting-disk, a driven shaft, a segmental gear thereon which engages the gear secured to said converting-disk, projections on said indexing-head, a cam on said driven shaft engaged by said projections, a locking-stud which engages a hole in said indexing-head between rotary actuations thereof on which said converting-disk is mounted and a cam-faced grooved block yieldingly supported in said converting-disk, which engages said movably-supported shaft, when the locking-stud is in register with a hole in the indexing-head, substantially as described.

6. The combination with a revoluble member, of means to impart rotary movement thereto, comprising an indexing-head provided with slots, a converting-disk, pins thereon adapted to engage the slots in said indexing-head, the relation being such that a pin on said converting-disk will always be in engagement with a slot in said indexing-head, and means to impart intermittent rotary movement to said converting-disk, substantially as described.

7. The combination with a revoluble member, of means for imparting rotary movement thereto, comprising an indexing-head provided with slots, a converting-disk, a pin thereon adapted to engage the slots in said indexing-head and means to impart intermittent rotary movement to said converting-disk, the relation being such that in positions of rest said pin will be in engagement with a slot in said indexing-head and the sides of said slot will be perpendicular to a radial line through said pin, substantially as described.

8. The combination with a revoluble member, of means for imparting rotary movement thereto, comprising an indexing-head provided with slots, a converting-disk, a pin thereon adapted to engage the slots in said indexing-head, means to impart intermittent rotary movement to said converting-disk, a part fixed relatively to said converting-disk and means to lock said converting-disk to said fixed part between rotary actuations thereof, the relation being such that in positions of rest said pin will be in engagement with a slot in said indexing-head and the sides of said slot will be perpendicular to a radial line through said pin, substantially as described.

9. The combination with a revoluble member, of means for imparting rotary movement thereto, comprising an indexing-head provided with slots, a converting-disk, pins thereon adapted to engage the slots in said indexing-head and means to impart intermittent rotary movement to said converting-disk, the relation being such that a pin on said converting-disk will always be in engagement with a slot in said indexing-head, and such, also, that in positions of rest a radial line through a pin in engagement with a slot in said indexing-head will be perpendicular to the sides of said slot, substantially as described.

10. The combination with a revoluble member, of means for imparting rotary movement thereto, comprising an indexing-head provided with slots, a converting-disk, pins thereon adapted to engage the slots in said indexing-head, means to impart intermittent rotary movement to said converting-disk, a part fixed relatively to said converting-disk, and means to lock said converting-disk to said fixed part between rotary actuations thereof, the relation being such that a pin on said converting-disk will always be in engagement with a slot in said indexing-head, and such, also, that in positions of rest a radial line through a pin in engagement with a slot in said indexing-head will be perpendicular to the sides of said slot, substantially as described.

11. The combination with a revoluble member, of means for imparting rotary movement thereto, comprising an indexing-head provided with slots, a converting-disk, pins thereon adapted to engage the slots in said indexing-head, means to impart intermittent rotary movement to said converting-disk, a part fixed relative to said converting-disk and a cam-faced, grooved block yieldingly supported in said converting-disk adapted for engagement with said fixed part, substantially as described.

12. The combination with a revoluble member, of means to impart rotary movement thereto, comprising an indexing-head provided with slots and holes, a converting-disk, pins thereon adapted to engage the slots in said indexing-head, a driven shaft, a gear secured to said converting-disk, a segmental gear on said driven shaft adapted to engage the gear on said converting-disk, means to prevent overcarrying of said converting-disk, means to impart reciprocating movement to said revoluble member and means to lock said revoluble member against rotary movement between engagements of said segmental gear with the gear on said converting-disk, comprising a rigid stud adapted to enter the holes in said indexing-head, substantially as described.

13. In a machine for making screws and the like, the combination of a movably-supported head, means for imparting reciprocating and rotary movement thereto, chucks on said head, a wedge applied to each of said chucks for closing the same and a movable member supported independently of said movably-supported head in position to engage the wedge of a chuck when in receiving position and adapted to impart movement to said wedge to close said chuck and to leave said wedge at rest with said chuck closed and means to actuate said movable member to thus close the chucks on said movably-supported head in succession.

14. In a machine for making screws and the like, the combination of a movably-supported head, means for imparting reciprocating and rotary movement thereto, chucks on said head, a wedge applied to each of said chucks for closing the same, a lever pivoted on the machine-frame in position to engage the wedge of a chuck when in receiving position and adapted to impart movement to said wedge to close said chuck and to leave said wedge at rest with said chuck closed, a driven shaft, a cam thereon and a projection on said actuating-lever which engages said cam, the relation being such that said lever will be actuated to thus close the chucks on said head in succession.

15. In a machine for making screws and the like, the combination of a movably-supported head, means for imparting reciprocating and rotary movement thereto, chucks on said head, a wedge comprising eccentric wedging-surfaces applied to each of said chucks for closing the same, separate slides on said movably-supported head in which said wedges are secured so as to be axially adjustable, a movable member supported independently of said movably-supported head in position to engage the wedge of a chuck when in receiving position and adapted to impart movement to said wedge to close said chuck and to leave said wedge at rest with said chuck closed and means to actuate said movable member to thus close the chucks on said movably-supported head in succession.

16. In a machine for making screws and the like, the combination of a movably-supported head, means for imparting reciprocating and rotary movement thereto, flanges on said head, chuck-bodies provided with slots secured in one of said flanges, shanks on said chuck-bodies secured in the other of said flanges, chuck-levers pivoted in the slots in said chuck-bodies, a wedge mounted on the shank of each chuck-body adapted to move the chuck-levers of said chuck pivotally to close said chuck, a movable member supported independently of said movably-supported head in position to engage the wedge of a chuck when in receiving position and adapted to impart movement to said wedge to close said chuck and to leave said wedge at rest with said chuck closed and means to actuate said movable member to thus close the chucks on said movably-supported head in succession.

17. In a machine for making screws and the like, the combination of a movably-supported head, means for imparting reciprocating and rotary movement thereto, chucks on said head, a wedge comprising eccentric wedging-surfaces mounted on the shank of each chuck-body, separate slides provided with guide-surfaces which engage corresponding guide-surfaces on said movably-supported head in which said wedges are secured so as to be axially adjustable, a movable member supported independently of said movably-supported head in position to engage the wedge of a chuck when in receiving position and adapted to impart movement to said wedge to close said chuck and to leave said wedge at rest with said chuck closed and means to actuate said movable member to thus close the chucks on said movably-supported head in succession.

18. In a machine for making screws and the like, the combination of a movably-supported head, means for imparting reciprocating and rotary movement thereto, chucks on said head, a wedge applied to each of said chucks for closing the same, means to impart movement to said wedges to successively close said chucks when they are in receiving position and to leave said wedges at rest with said chucks closed and means to retract said wedges to permit said chucks to open as they successively come into discharging position, said means consisting of a fixed pin which projects into the path of travel of the wedge of a chuck or of a rigid part thereof when said chuck is in discharging position as the movably-supported head advances.

19. In a machine for making screws and the like, the combination with a movably-supported head and means for imparting reciprocating and rotary movement thereto, of levers pivoted thereon, chuck-jaws on said levers, springs applied to said levers, wedges, an oscillating lever for advancing said wedges between said levers when the chuck-jaws thereon are in receiving position, means to retract said wedges from between said levers when the chuck-jaws thereon are in discharging position and means to discharge articles from said chuck-jaws comprising plungers, a member pivoted to the wedge-operating lever which strikes a discharge-plunger when said chuck-jaws are in discharging position and a shank on said member which engages a suitable guide-bearing, substantially as described.

20. In a machine for making screws and the like, the combination of a discharge-tube and a plurality of tools mounted in a circle, a movably-supported head, means to impart reciprocating and rotary movement thereto, chucks on said head, a wedge applied to each of said chucks for closing the same, discharge-plungers fitted to and longitudinally movable in axial bearings in said chucks, a movable member supported independently of said movably-supported head in position to engage the wedge of a chuck when in receiving position and to leave said wedge at rest with said chuck closed and comprising a part adapted to engage the discharge-plunger of a chuck when in register with the discharge-tube and to impart movement to said plunger to advance the end thereof through said chuck and means to actuate said movable member to thus close the chucks on said movably-supported head and advance the discharg-plungers thereof in succession.

21. In a machine for making screws and the like, the combination of a discharge-tube and a plurality of tools mounted in a circle, a movably-supported head, means to impart reciprocating and rotary movement thereto, chucks on said head, discharge-plungers fitted to and longitudinally movable in axial bearings in said chucks, a movable member supported independently of said movably-supported head in position to engage the discharge-plunger of a chuck when said chuck is in register with the discharge-tube and adapted to impart movement to said plunger to advance the end thereof through said chuck and means to actuate said movable member to thus advance the plungers of said chucks in succession.

22. In a machine for making screws and the like, the combination of a plurality of tools mounted in a circle, a head, means to impart reciprocating and rotary movement to said head, chuck-jaws on said head, means to open and close said chuck-jaws, a receiving member, means to discharge articles from said chuck-jaws, into said receiving member and fingers which hold said chuck-jaws closed during the operation of said discharge mechanism, substantially as described.

23. In a machine for making screws and the like, the combination of a plurality of tools mounted in a circle, a head, means to impart reciprocating and rotary movement thereto, levers pivoted upon said head, chuck-jaws on said levers, wedges, means to advance said wedges between said levers and to retract them therefrom, a receiving member, means to discharge articles from said chuck-jaws into said receiving member and fingers which embrace said chuck-jaw levers and hold said chuck-jaws closed during the operation of the discharge mechanism, the relation being such that the wedge will be retracted from between said levers after said levers are embraced by said fingers and before the operation of the discharge mechanism, substantially as described.

24. In a machine for making screws and the like, the combination of a plurality of tools mounted in a circle, said tools including a broach, a head, means to impart reciprocating and rotary movement to said head, chuck-jaws on said head and means to discharge articles from said chuck-jaws through said broach, substantially as described.

25. In a machine for making screws and the like, the combination of a plurality of tools mounted in a circle, said tools including a broach, a head, means to impart reciprocating and rotary movement to said head, chuck-jaws on said head and means to discharge articles from said chuck-jaws through said broach, said means comprising plungers and means to advance said plungers through said chuck-jaws, substantially as described.

26. In a machine for making screws and the like, the combination of a plurality of tools mounted in a circle, said tools including a broach, a head, means to impart reciprocating and rotary movement to said head, chuck-jaws on said head and means to discharge articles from said chuck-jaws through said broach, said means comprising plungers and a reciprocating member adapted to advance said plungers through said chuck-jaws, substantially as described.

27. In a machine for making screws and the like, the combination of a plurality of tools mounted in a circle, said tools including a broach, a head, means to impart reciprocating and rotary movement to said head, chuck-jaws on said head and means to discharge articles from said chuck-jaws through said broach, said means comprising plungers, springs applied thereto, stops which limit the movement of said plungers and a reciprocating member adapted to advance said plungers through said chuck-jaws, substantially as described.

28. In a machine for making screws and the like, the combination of a discharge-tube and a plurality of tools mounted in a circle, said tools comprising a broach in register with said discharge-tube, a head, means to impart reciprocating and rotary movement thereto, chuck-jaws on said head and means to discharge articles therefrom through said broach and into said discharge-tube, substantially as described.

29. In a machine for making screws and the like, the combination of a stock-spindle and a plurality of tools mounted in a circle, a head, means to impart reciprocating and rotary movement thereto, chuck-jaws thereon, means to feed a bar of stock through said stock-spindle, means to rotate said stock-spindle, means to stop said stock-spindle, a pivoted lever, a cut-off tool carried thereon, a spring applied to said cut-off-tool lever adapted to retract the cut-off tool, a driven shaft, cams thereon, one of which is adapted to impart pivotal movement to said cut-off-tool lever to partially sever a blank from a bar of stock in said stock-spindle and the other of which is adapted to impart pivotal movement to said cut-off-tool lever to finish the end of a blank on the end of a bar of stock in said stock-spindle, substantially as described.

30. In a machine for making screws and the like, the combination with a stock-spindle and a plurality of tool-carrying spindles mounted in a circle and in parallel position, a blank-carrying head, a plurality of chucks thereon, means to impart movement to said head toward and from said stock and tool-carrying spindles, means to impart intermittent rotary movement to said blank-carrying head to bring the chucks thereon successively in register with the different spindles, both stock and tool carrying spindles, means to feed a bar of stock through said stock-spindle to a chuck on the blank-carrying head in register therewith and means to sever blanks from said bar of stock.

31. In a machine for making screws and the like, the combination of a plurality of tools mounted in a circle, a blank-carrying head and means to impart reciprocating and rotary movement to said blank-carrying head, said tools including a pointing-tool, a spindle on which said pointing-tool is carried, means to rotate said spindle and means to impart movement to said pointing-tool away from said blank-carrying head as said blank-carrying head advances and at a slower rate of speed, substantially as described.

32. In a machine for making screws and the like, the combination of a plurality of tools mounted in a circle, a blank-carrying head and means to impart reciprocating and rotary movement to said blank-carrying head, said tools including a pointing-tool, a spindle on which said pointing-tool is carried, means to rotate said spindle and means controlled by the movement of said blank-carrying head for imparting movement to said pointing-tool away from said blank-carrying head as said blank-carrying head advances and at a slower rate of speed, substantially as described.

33. In a machine for making screws and the like, the combination of a plurality of tools mounted in a circle, a blank-carrying head and means to impart reciprocating and rotary movement to said blank-carrying head, said tools including a pointing-tool, a spindle on which said pointing-tool is carried, means to rotate said spindle and means to impart movement to said pointing-tool away from said blank-carrying head as said blank-carrying head advances, said means comprising a pivoted lever, connection between said lever and said pointing-tool and a plunger on said blank-carrying head adapted to strike a rigid portion of said lever, the point of engagement of said plunger with said lever and the point of connection of said lever to said pointing-tool being at different distances from the pivotal point of said lever, substantially as described.

34. In a machine for making screws and the like, the combination of a plurality of tools mounted in a circle, a blank-carrying head and means to impart reciprocating and rotary movement to said head, said tools including a pointing-tool, a spindle on which said pointing-tool is carried, means to rotate said spindle, means to impart movement to said pointing-tool away from said blank-carrying head as said blank-carrying head advances and at a slower rate of speed, said means comprising a pivoted lever, connection between said lever and said pointing-tool, a plunger on said blank-carrying head adapted to strike a rigid portion of said pivoted lever as said blank-carrying head advances, a spring applied to said pointing-tool adapted to advance the same and a stop which limits the movement of said pointing-tool under the influence of said spring, substantially as described.

35. In a machine for making screws and the like, the combination of a plurality of tools mounted in a circle, a blank-carrying head and means to impart reciprocating and rotary movement to said head, said tools including a pointing-tool, a hollow spindle, means to rotate the same, an auxiliary spindle fitted to and longitudinally movable in bearings in said hollow spindle, in which said pointing-tool is directly secured, a pin in said auxiliary spindle which extends through longitudinal slots in said hollow spindle, a spring applied to said auxiliary spindle adapted to advance the same, a pivoted lever, connection between said lever and said auxiliary spindle and a plunger on said blank-carrying head adapted to strike a rigid portion of said pivoted lever, the point of engagement of said plunger with said lever and the point of connection of said lever with said auxiliary spindle being at different distances from the pivotal point of said lever, substantially as described.

36. In a machine for making screws and the like, the combination of a plurality of tools mounted in a circle, a blank-carrying head and means to impart reciprocating and rotary movement to said blank-carrying head, said tools including a pointing-tool, a hollow spindle, an auxiliary spindle fitted to and longitudinally movable in bearings in said hollow spindle in which said pointing-tool is directly secured, a pin secured in said auxiliary spindle which extends through a longitudinal slot in said hollow spindle, a spring applied to said auxiliary spindle adapted to advance the same, a pivoted lever, connection between said lever and said auxiliary spindle, a plunger on said blank-carrying head adapted to strike a rigid portion of said lever, the point of engagement of said plunger with said lever and the point of connection of said lever with said auxiliary spindle being at different distances from the pivotal point of said lever, substantially as described.

37. In a machine for making screws and the like, the combination of a plurality of tools mounted in a circle, a blank-carrying head and means to impart reciprocating and rotary movement to said blank-carrying head, said tools including a pointing-tool, a hollow spindle, means to rotate the same, an auxiliary spindle fitted to and longitudinally movable in bearings in said hollow spindle in which said pointing-tool is directly secured, a ring on said hollow spindle, a pin secured in said ring and in said auxiliary spindle which extends through a longitudinal slot in said hollow spindle, a box fitted to said hollow spindle provided with an opening or recess the sides of which embrace the ring pinned to said auxiliary spindle, a pivoted lever, pivotal connection between said lever and the box on said hollow spindle, a plunger on the blank-carrying head which strikes a rigid portion of said pivoted lever as said blank-carrying head advances, the point of engagement of said plunger with said lever and the point of connection of said lever with said auxiliary spindle being at different distances from the pivotal point of said lever, and a spring applied to said auxiliary spindle adapted to advance the same, substantially as described.

38. In a machine for making screws and the like, the combination of a plurality of tools mounted in a circle, a blank-carrying head and means to impart reciprocating and rotary movement to said head, said tools including a pointing-tool, a hollow spindle, means to rotate said hollow spindle, an auxiliary spindle fitted to and longitudinally movable in bearings in said hollow spindle in which said pointing-tool is directly secured, a ring on said hollow spindle, a pin secured in said ring and in said auxiliary spindle and which passes through a longitudinal slot in said hollow spindle, a box on said hollow spindle provided with a recess or opening the sides of which embrace the ring pinned to said auxiliary spindle, a pivoted lever, pivotal connection between said lever and the box on said hollow spindle, a plunger on the blank-carrying head adapted to strike a rigid portion of said pivoted lever as said blank-carrying head advances, the point of engagement of said plunger with said lever and the point of pivotal attachment of said lever to said box on said hollow spindle being at different distances from the pivotal point of said lever and a spring applied to said auxiliary spindle adapted to advance the same, substantially as described.

39. In a machine for making screws and the like, the combination of a plurality of tools mounted in a circle, a blank-carrying head and means to impart reciprocating and rotary movement thereto, said tools including a pointing-tool, a hollow spindle, means to rotate said hollow spindle, an auxiliary spindle fitted to and longitudinally movable in bearings in said hollow spindle, in which said pointing-tool is directly secured, a ring on said hollow spindle, a pin secured in said ring and in said auxiliary spindle and which passes through a longitudinal slot formed in said hollow spindle, a spring applied to said auxiliary spindle adapted to maintain the same at the forward limit of its movement, a box on said hollow spindle provided with a recess the sides of which embrace the ring pinned to said auxiliary spindle, a pivoted lever, pivotal connection between said pivoted lever and the box on said hollow spindle and a plunger on the blank-carrying head adapted to strike a rigid portion of said pivoted lever, the point of attachment of said pivoted lever to the box on said hollow spindle being between the pivotal point of said lever and the point of engagement of the plunger on said blank-carrying head with said lever, substantially as described.

40. The combination with an opening-die of a spring or springs applied thereto adapted to operate the same in one direction, a lever applied thereto adapted to operate the same against the force of said spring or springs and means to impart pivotal movement to said lever comprising a driven shaft, a cam thereon, a bar on said lever which projects into the path of said cam, means to adjust said bar lengthwise of said lever and means to secure said bar in adjusted position on said lever, substantially as described.

41. In a machine for making screws and the like, the combination with a blank-carrying head, means to actuate the same and a counter, of means to operate said counter, disposed in position to be actuated by a screw or blank supported on said blank-carrying head, substantially as described.

42. In a machine for making screws and the like, the combination of a plurality of tools mounted in a circle, a blank-carrying head, means to impart reciprocating and rotary movement to said head, chuck-jaws on said head, a counter and means to operate said counter, said means comprising a longitudinally-movable rod mounted in the circle with the tools the end of which projects into the path of a blank secured in the chuck-jaws when in alinement therewith, means to secure said rod against rotary movement, a sleeve on said rod which is movable both revolubly and longitudinally thereof, an arm on said sleeve, operative connection between said arm and counter, said sleeve being provided with a cam-slot comprising a straight and an inclined section, a pin secured in said rod which engages the cam-slot in said sleeve, stops which secure said sleeve in fixed longitudinal position, a spring applied to said rod and a stop which limits the movement of said rod under the influence of said spring, the relation of parts being such that, normally, the pin in said rod is in engagement with the inclined section of the cam-slot in said sleeve, substantially as described.

43. In a machine for making screws and the like, the combination of a plurality of tools mounted in a circle, a blank-carrying head, means to impart reciprocating and rotary movement to said head, chuck-jaws on said head, a counter and means to operate said counter, said means comprising a longitudinally-movable rod mounted in the circle with the tools the end of which projects into the path of a blank secured in the chuck-jaws when in alinement therewith, means to secure said rod against rotary movement, a sleeve on said rod which is movable both revolubly and longitudinally thereof, an arm on said sleeve, operative connection between said arm and counter, said sleeve being provided with a cam-slot comprising a straight and an inclined section, a pin secured in said rod which engages the cam-slot in said sleeve, a stop which secures said sleeve against movement in one direction, a stop which limits the movement of said rod in the opposite direction and a spring inserted between the stop on said rod and the end of said sleeve, the relation of parts being such that, normally, the pin in said rod is in engagement with the inclined section of the cam-slot in said sleeve, substantially as described.

44. In a machine for making screws and the like, the combination with a plurality of tool-spindles, including a threading-die spindle, and a power-shaft, of driving connections for said spindles, other than the threading-die spindle, comprising driving connection between one of said spindles and said power-shaft and driving connections between said spindle so driven from said power-shaft and the other of said spindles, and independent driving connection between said power-shaft and the threading-die spindle, substantially as described.

45. In a machine for making screws and the like, the combination with a plurality of tool-spindles, including a threading-die spindle, and a power-shaft, of driving connections for said spindles, other than the threading-die spindle comprising beveled gears connecting said power-shaft with one of said spindles and spur-gears connecting said spindle with the others, and worm-gears connecting said power-shaft with said threading-die spindle, substantially as described.

46. A base for a screw-machine or the like the sides and bottom of which are closed, a floor above the bottom of said base, an inclined trough formed in the bottom of said floor and said floor declining toward said trough at both sides thereof, a screw conveyer mounted in said trough, means to rotate the same, an opening provided in said floor below the discharge end of said trough and a sluice-box beneath said opening, substantially as described.

In testimony that we claim the foregoing as our invention we affix our signatures, in presence of two subscribing witnesses, this 30th day of April, A. D. 1902.

WALTER B. PEARSON.
CHARLES E. ROBERTS.

Witnesses:
M. S. SOMERVILLE,
ROBERT J. CATCHPOLE.